United States Patent
Abe et al.

(10) Patent No.: US 7,046,630 B2
(45) Date of Patent: May 16, 2006

(54) PACKET SWITCHING NETWORK, PACKET SWITCHING EQUIPMENT AND NETWORK MANAGEMENT EQUIPMENT

(75) Inventors: Hajime Abe, Yokohama (JP); Kazuho Miki, New York, NY (US); Noboru Endo, Kodaira (JP); Akihiko Takase, Tokyo (JP); Yoshito Sakurai, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/286,464

(22) Filed: Nov. 1, 2002

(65) Prior Publication Data
US 2003/0091049 A1 May 15, 2003

Related U.S. Application Data

(63) Continuation of application No. 09/410,562, filed on Oct. 1, 1999, now Pat. No. 6,512,745, which is a continuation of application No. 09/093,265, filed on Jun. 8, 1998, now Pat. No. 6,108,304, which is a continuation-in-part of application No. 08/810,733, filed on Mar. 4, 1997, now Pat. No. 6,002,668, and a continuation-in-part of application No. 08/998,382, filed on Dec. 24, 1997, now Pat. No. 6,304,555.

(30) Foreign Application Priority Data

| Mar. 8, 1996 | (JP) | ................................ 8-051314 |
| Dec. 25, 1996 | (JP) | ................................ 8-344981 |
| Jun. 10, 1997 | (JP) | ................................ 9-151855 |

(51) Int. Cl.
  *H04L 12/56* (2006.01)
(52) U.S. Cl. ..................................... 370/232; 370/397

(58) Field of Classification Search ........... 370/395.32, 370/397, 399, 400, 402, 428, 230, 232, 233, 370/234, 595.52, 401, 466, 467, 470, 474; 379/112.01, 112.05, 112.06, 112.08, 221.07, 379/221.15, 229
See application file for complete search history.

(56) References Cited

U.S. PATENT DOCUMENTS 4,736,363 A    4/1988 Aubin et al. .................. 370/60

(Continued)

FOREIGN PATENT DOCUMENTS

EP          502436 A2    9/1992

(Continued)

OTHER PUBLICATIONS

Anthony Alles, "ATM Internetworking," Sep. 1995, p. 121.

(Continued)

*Primary Examiner*—Duc Ho
*Assistant Examiner*—Phuongchau Ba Nguyen
(74) *Attorney, Agent, or Firm*—Sofer & Haroun, LLP

(57) ABSTRACT

This invention provides a network management equipment and a packet switching equipment which eliminate a connection setup delay time, reduce a delay and a delay variation involved in data transfer, and effectively perform connectionless data flow processing in a large data network. The network is divided into a connection-oriented core network and a plurality of connectionless access networks connected to the core network where a plurality of connections (called permanent virtual route (PVR)) are set up among a plurality of edge nodes. The network management equipment selects one route from a plurality of PVRs for connectionless data flow received from one of the access networks and transfers data along the PVR.

4 Claims, 24 Drawing Sheets

U.S. PATENT DOCUMENTS

| | | | |
|---|---|---|---|
| 4,939,726 A | 7/1990 | Flammer et al. | 370/94 |
| 5,016,243 A | 5/1991 | Fite, Jr. | 370/16 |
| 5,042,027 A * | 8/1991 | Takase et al. | 370/252 |
| 5,241,534 A | 8/1993 | Omuro et al. | 370/16 |
| 5,359,600 A | 10/1994 | Ueda et al. | 12/56 |
| 5,412,376 A | 5/1995 | Chujo et al. | 340/825.01 |
| 5,426,636 A | 6/1995 | Hiller et al. | 370/60.1 |
| 5,452,293 A | 9/1995 | Wilkinson et al. | 370/54 |
| 5,485,455 A | 1/1996 | Dobbins et al. | 370/60 |
| 5,519,700 A | 5/1996 | Punj | 12/56 |
| 5,526,353 A | 6/1996 | Henley et al. | 370/60.1 |
| 5,572,678 A | 11/1996 | Homma et al. | 395/200 |
| 5,663,959 A | 9/1997 | Nakagawa | 370/395 |
| 5,675,576 A | 10/1997 | Kalampoukas | 370/232 |
| 5,764,740 A * | 6/1998 | Holender | 379/112.05 |
| 5,835,710 A | 11/1998 | Nagami et al. | 395/200.8 |
| 5,917,820 A | 6/1999 | Rekhter | 370/392 |
| 5,956,339 A | 9/1999 | Harada et al. | 370/400 |
| 5,963,555 A | 10/1999 | Takase et al. | 370/395 |
| 6,002,674 A | 12/1999 | Takei et al. | 370/254 |
| 6,046,999 A | 4/2000 | Miki et al. | 370/395 |
| 6,075,787 A | 6/2000 | Bobeck et al. | 370/395 |
| 6,108,304 A * | 8/2000 | Abe et al. | 370/232 |
| 6,118,783 A | 9/2000 | Kunito | 12/28 |
| 6,275,494 B1 * | 8/2001 | Endo et al. | 370/466 |
| 6,314,098 B1 * | 11/2001 | Masuda et al. | 370/474 |
| 6,512,745 B1 * | 1/2003 | Abe et al. | 370/232 |

FOREIGN PATENT DOCUMENTS

| | | | | |
|---|---|---|---|---|
| EP | 597487 A2 | 5/1994 | | |
| JP | 4260245 | 9/1992 | | |
| JP | 4276943 | 10/1992 | | |
| JP | 244859 | 9/1994 | | 12/48 |
| JP | 8125692 | 5/1996 | | |
| JP | 9130386 | 5/1997 | | 12/28 |
| JP | 9181740 | 7/1997 | | |
| JP | 9247169 | 9/1997 | | |
| WO | 9607281 | 3/1996 | | |
| WO | 9748214 | 12/1997 | | |

OTHER PUBLICATIONS

"ATM Forum UNI version 3.1," PTR Prentice Hall Prentice-Hall, Inc., 1995.

Lixia Zhang et al., "RSVP: A New Resource ReSerVation Protocol", IEEE Network, Sep. 1993.

Juha Heinanen, "Multiprotocol Encapsulation Over ATM Adapatation Layer 5," Request for Comments: 1483, Jul. 1993.

"Data Structure and Algorithm", Baifukan Co., Ltd., Mar. 1987, p. 239.

"ABR Flow Control", Traffic Management Specification Version 4.0.

K. Sklower et al., "The PPP Multilink Protocol (MP)," Aug. 1996.

European Search Report dated Feb. 13, 2001.

Burak M: "Connectionless Services In an ATM-LAN Provided By a CL-Server an Implementation and Case Study" proceedings of the global telecommunications conference, US, New York, IEEE dated Nov. 28, 1994.

Self-sizing Network Operation Systems in ATM Networks by Nakagawa et al., dated Apr. 15, 1996; NTT Telecommunication Network Lab.

Centralized Virtual Path Bandwidth Allocation Scheme for ATM Networks by Logothetis et al., dated Oct. 1992, IEICE Transactions on Communications.

ATM VP-Based Broadband Networks for Multimedia Services by Aoyama et al, dated Apr. 31, 1993, IEEE Communications Magazine.

European Search Report dated Oct. 21, 2003; EP 98 11 0367.

J. Murayama et al. "Core Network Design for Large-Scale Internetworking", NTT R&D, vol. 46, No. 3, pp. 223-232 dated Mar. 19, 1997.

Y. Kamizuru. "Routing Control for Multihomed Ass" IPS Journal vol. 95, No. 61, 95-DPS-71-3 (Multimedia Communication and Distributed Processing 71-3) dated Jul. 13, 1995.

European Office Action dated Feb. 2, 2005.

A Dynamically Controllable ATM Transport Network Based on the Virtual Path Concept—NTT Transmission Systems Laboratories, Nov. 28, 1998, pp. 1272-1276.

* cited by examiner

FIG.3

| PVR-ID | CONNECTION BETWEEN POINTS | ROUTE | ASSIGNED BANDWIDTH |
|---|---|---|---|
| R1 | EA-EB | EA-N2-EB | 15Mbit/s |
| R2 | EA-EC | EA-N1-N3-EC | 20Mbit/s |
| R3 | EB-EC | EB-N2-EC | 5Mbit/s |
| R4 | EB-ED | EB-N2-N1-ED | 10Mbit/s |
| R5 | EC-ED | EC-N3-N1-ED | 15Mbit/s |
| R6 | EA-EC | EA-N2-EC | 10Mbit/s |

PVR-ID : PERMANENT VIRTUAL ROUTE IDENTIFIER

FIG.5

| EDGE NODE NAME : EA / 101.102.103.104 | | | | |
|---|---|---|---|---|
| PVR-ID | DESTINATION SUBNET | VPI | VCI | PORT INF |
| R1 | #B | 10 | 11 | 1 |
| R2 | #C | 11 | 12 | 2 |
| R6 | #C | 10 | 17 | 1 |
|  |  |  |  |  |

PVR-ID : PERMANENT VIRTUAL ROUTE IDENTIFIER
VPI : VIRTUAL PATH IDENTIFIER
VCI : VIRTUAL CHANNEL IDENTIFIER
PORT INF : PORT INTERFACE

FIG.6

| EDGE NODE NAME : EB / 104.101.102.103 | | | | |
|---|---|---|---|---|
| PVR-ID | DESTINATION SUBNET | VPI | VCI | PORT INF |
| R1 | #A | 10 | 11 | 1 |
| R3 | #C | 10 | 13 | 1 |
| R4 | #D | 11 | 15 | 1 |
|  |  |  |  |  |

PVR-ID : PERMANENT VIRTUAL ROUTE IDENTIFIER
VPI : VIRTUAL PATH IDENTIFIER
VCI : VIRTUAL CHANNEL IDENTIFIER
PORT INF : PORT INTERFACE

FIG.7

| EDGE NODE NAME : EC / 103.104.101.102 | | | | |
|---|---|---|---|---|
| PVR-ID | DESTINATION SUBNET | VPI | VCI | PORT INF |
| R2 | #A | 10 | 11 | 1 |
| R3 | #B | 11 | 14 | 2 |
| R5 | #D | 10 | 19 | 1 |
| R6 | #A | 11 | 16 | 2 |
|  |  |  |  |  |

PVR-ID : PERMANENT VIRTUAL ROUTE IDENTIFIER
VPI : VIRTUAL PATH IDENTIFIER
VCI : VIRTUAL CHANNEL IDENTIFIER
PORT INF : PORT INTERFACE

FIG.8

| EDGE NODE NAME : ED / 102.103.104.101 | | | | |
|---|---|---|---|---|
| PVR-ID | DESTINATION SUBNET | VPI | VCI | PORT INF |
| R4 | #B | 11 | 13 | 1 |
| R5 | #C | 10 | 18 | 1 |
|  |  |  |  |  |

PVR-ID : PERMANENT VIRTUAL ROUTE IDENTIFIER
VPI : VIRTUAL PATH IDENTIFIER
VCI : VIRTUAL CHANNEL IDENTIFIER
PORT INF : PORT INTERFACE

FIG.9

| RELAY NODE NAME : N1 | INPUT | | | OUTPUT | | |
|---|---|---|---|---|---|---|
| PVR-ID | VPI | VCI | PORT INF | VPI | VCI | PORT INF |
| R2 | 11 | 12 | 1 | 20 | 11 | 3 |
| R4 | 20 | 18 | 2 | 11 | 13 | 4 |
| R5 | 20 | 06 | 3 | 10 | 18 | 4 |

PVR-ID : PERMANENT VIRTUAL ROUTE IDENTIFIER
VPI : VIRTUAL PATH IDENTIFIER
VCI : VIRTUAL CHANNEL IDENTIFIER
PORT INF : PORT INTERFACE

FIG.10

| RELAY NODE NAME : N2 | INPUT | | | OUTPUT | | |
|---|---|---|---|---|---|---|
| PVR-ID | VPI | VCI | PORT INF | VPI | VCI | PORT INF |
| R1 | 10 | 17 | 1 | 10 | 11 | 5 |
| R3 | 10 | 13 | 5 | 11 | 14 | 4 |
| R4 | 11 | 15 | 1 | 20 | 18 | 2 |
| R6 | 10 | 17 | 1 | 11 | 16 | 4 |

PVR-ID : PERMANENT VIRTUAL ROUTE IDENTIFIER
VPI : VIRTUAL PATH IDENTIFIER
VCI : VIRTUAL CHANNEL IDENTIFIER
PORT INF : PORT INTERFACE

FIG.11

| RELAY NODE NAME : N3 | | | | | | |
|---|---|---|---|---|---|---|
| | INPUT | | | OUTPUT | | |
| PVR-ID | VPI | VCI | PORT INF | VPI | VCI | PORT INF |
| R2 | 20 | 11 | 2 | 10 | 11 | 3 |
| R5 | 10 | 19 | 3 | 20 | 06 | 2 |

PVR-ID : PERMANENT VIRTUAL ROUTE IDENTIFIER
VPI : VIRTUAL PATH IDENTIFIER
VCI : VIRTUAL CHANNEL IDENTIFIER
PORT INF : PORT INTERFACE

FIG.15

ROUTING TABLE SEARCH AND SETUP
PROCEDURE USED IN EDGE NODE EA

| EDGE NODE NAME : EA / 101.102.103.104 |||
|---|---|---|
| DESTINATION SUBNET | BANDWIDTH | PVD-ID |
| #B | 15Mbit/s | R1 |
| #C | 20Mbit/s | R2 |
| #C | 10Mbit/s | R6 |

| EDGE NODE NAME : EA / 101.102.103.104 |||||
|---|---|---|---|---|
| PVR-ID | DESTINATION SUBNET | VPI | VCI | PORT INF |
| R1 | #B | 10 | 11 | 1 |
| R2 | #C | 11 | 12 | 2 |
| R6 | #C | 10 | 17 | 1 |

CHECK THE DESTINATION ADDRESS OF THE CONNECTIONLESS DATA FLOW TO FIND THE DESTINATION SUBNET.

→ FROM A PLURALITY OF REGISTERED ROUTES TO THE DESTINATION SUBNET SELECT A ROUTE WITH THE LARGEST BANDWIDTH.

→ GET A PAIR OF VPI/VCI AND PORT INF CORRESPONDING TO THE SELECTED PVR-ID.

→ STORE VPI/VCI SELECTED IN THE PREVIOUS STEP INTO THE HEADER OF THE ATM CELL.

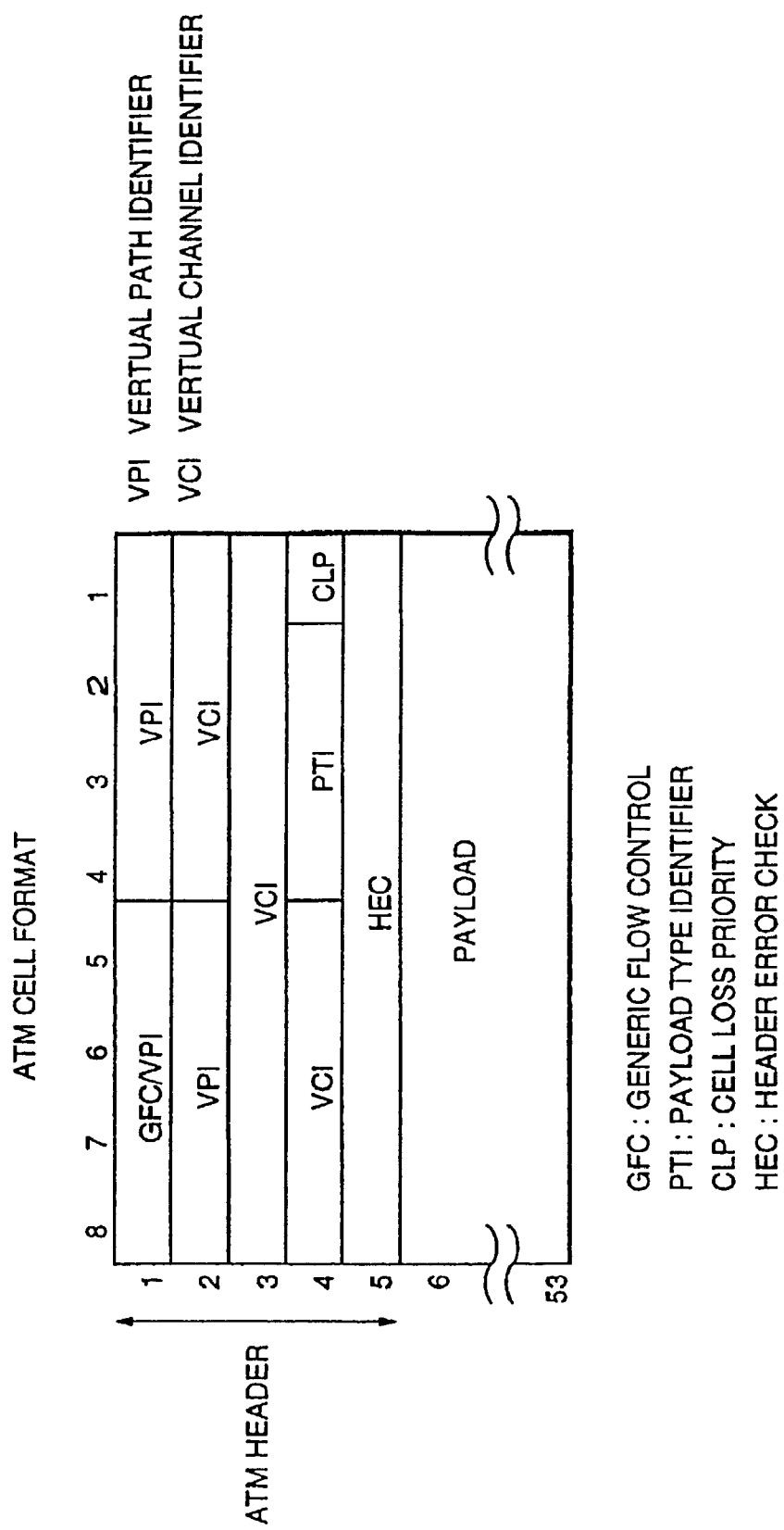

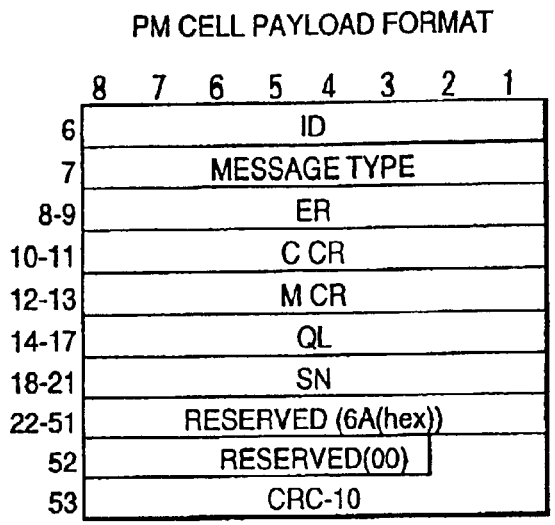

FIG.20A

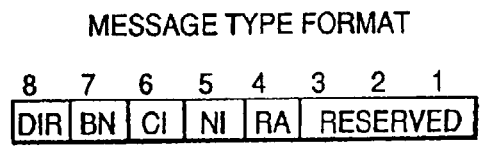

FIG.20B

| | |
|---|---|
| ID | : IDENTIFIER |
| MESSAGE TYPE | : MESSAGE TYPE |
| ER | : EXPLICIT RATE |
| CCR | : CURRENT CELL RATE |
| MCR | : MINIMUM CELL RATE |
| QL | : QUEUE LENGTH |
| SN | : SEQUENCE NUMBER |
| RESERVED | : RESERVED FIELD |
| (6A(hex)) | : CONTAINS "01101010". |
| (00) | : CONTAINS ALL "0s". |
| CRC-10 | : CYCLIC REDUNDANCY CHECK |
| DIR | : DIRECTION INDICATION BIT |
| BN | : BACKWARD CONGESTION INDICATION BIT |
| CL | : CONGESTION INDICATION BIT |
| NI | : NO RATE INCREASE BIT |
| RA | : (UNUSED BY ABR OF ATM FORUM) |

PACKET SWITCHING NETWORK, PACKET SWITCHING EQUIPMENT AND NETWORK MANAGEMENT EQUIPMENT

This application is a continuation of the U.S. continuation patent application Ser. No. 09/410,562 filed Oct. 9, 1999 now U.S. Pat. No. 6,512,745 which is a continuation application of U.S. patent application Ser. No. 09/093,265, filed on Jun. 8, 1998 now U.S. Pat. No. 6,108,304, which in turn claims a priority of a continuation-in-part application of U.S. patent application Ser. No. 08/810,733 filed on Mar. 4, 1997 now U.S. Pat. No. 6,002,668 and U.S. patent application Ser. No. 08/998,382 filed on Dec. 24, 1997 now U.S. Pat. No. 6,304,555.

BACKGROUND OF THE INVENTION

1. Field of the Invention

This invention relates to a network, a packet switching network, a packet switching system, and network management equipment which efficiently process a large amount of connectionless data traffic using a connection-oriented network such as an ATM network.

2. Description of Related Art

Recently, as the Internet has rapidly evolved, networks and switching systems which efficiently process a large amount of connectionless data traffic with the use of a connection-oriented network, such as a ATM network, have been offered. 'Connectionless' means that data is sent without first setting up a connection to the destination, while 'connection-oriented' means that data is sent after setting up a connection to the destination.

For example, the MPOA protocol architecture is described on page 121 in "ATM Internetworking" (Nikkei BP Publishing Center INC.; First edition, Sep. 22, 1995). MPOA is an abbreviation for Multi Protocol ATM. When communicating via the MPOA, an ATM address generated at the MPOA server by converting the layer-3 destination address (for example, destination IP (Internet Protocol) address) is obtained and then an ATM connection is set up using the ATM signaling protocol. Note that the ATM connection used in the protocol is an SVC (Switched Virtual Connection) which is set up on a request-basis when there is data traffic to be sent. The signaling protocol for an SVC is described, for example, in "ATM Forum UNI version 3.1" (Prentice-Hall, Inc.: 1995).

Another communication protocol is an RSVP (Resource Reservation Protocol) described in "RSVP: A New Resource ReSerVation Protocol" (September 1993 number of IEEE Network). The RSVP requires that the receiver sequentially reserve communication bandwidth, a router, a buffer, and other resources for a data path between the sender and the receiver. After the resources have been reserved, data is sent.

A typical connection-oriented communication is a telephone. This communication requires real-time software processing, called call admission control, and resource reservation. Once the resources are reserved, the communication bandwidth, usually the bidirectional bandwidth, is guaranteed. In this communication mode, because the resources are not released even when there is no traffic, the resource usage efficiency is low.

On the other hand, in connectionless communication which is used primarily for LANs, the resources are reserved for each burst of data. This communication is suited for sending a large amount of data instantaneously in one direction only. However, because the communication bandwidth is not always guaranteed in this communication, resource contention occurs as the whole resource usage ratio becomes high. In addition, because data which could not be sent because of insufficient resources must be resent, the resources become more insufficient and, as a result, congestion may result.

ATM was introduced to solve these two problems. ATM contributes to the efficient use of resources. However, ATM still has the two problems described above. That is, ATM still requires complex call admission control and, in addition, results in congestion when the resources become insufficient.

Ideally, all communications should be done via ATM to take full advantage of ATM. However, telephones, LANs, and WANs (Wide Area Network) are used in real time communications and, therefore, the shift of all the communication facilities to those of ATM is not so easy. Because more and more traffic is expected over these networks in future, ATM networks must co-exist with conventional data communication networks.

As the term LAN implies, emphasis has been placed on local communication in the conventional data communication. Recently, however, the need for global communication, such as the Internet, has arisen. In such global communication, an error at a single site in the connectionless communication mode may cause other sites to resend data, one after another, and may cause immediate congestion around the world. This requires a large network to manage resources (such as bandwidth allocation) and to manage a large amount of resources hierarchically.

The above description deals primarily with the problems with the "quantity" and the "scale" of data communication. We must also consider the problems with "quality." As communication finds its way into our lives, a need has arisen for a variety of services using the telephone network, including automatic message transfer, sender's number indication, collect call, and teleconferencing. To meet these needs, intelligent networks have been built in the telephone network for efficient control signal communication. It is expected that the same need will also arise for data communication. In data communication networks, intelligent networks may also be used as with telephone networks, or a virtual network may be built logically in an ATM network to take full advantage of its characteristics. However, the conventional IAN-oriented data communication networks are not fully compatible with ATM networks, meaning that in a large data communication network, various operations must be performed. For example, in a large data communication network, the user must keep track of data traffic, control communication bandwidths dynamically, or provide additional information on services. Also included in the quality features are the network error isolation function and the congestion prevention function.

The following describes in more detail the problems this invention will try to solve.

When communicating via MPOA, a request-based ATM connection is set up in the SVC mode when there is a data traffic to be sent. Therefore, the data transfer delay time is increased by the time needed to set up an ATM connection. In the worst case, the ATM connection time may be longer than the data transfer time. In addition, when many users generate data and set up request-based connections, many control packets for connection setup and disconnection are transferred before and after actual data transfer. This may result in network congestion.

On the other hand, when communicating via RSVP, the data transfer delay and the delay variation become large because the resources must be reserved before data is sent.

In addition, the need to hold the resources such as bandwidth requires the sender to send a refresh packet at a regular interval for holding the resources. Therefore, when there are many users who generate data, the communication of control packets necessary for resource reservation uses a lot of bandwidth, making network management more complex.

SUMMARY OF THE INVENTION

This invention seeks to solve the following problems.

It is a first object of this invention to provide a packet switching network, packet switching device, and a network management equipment which eliminate the need to set up connections to reduce a delay and a delay variation involved in data transfer and to reduce the number of control packets for connection setup and resource reservation.

It is a second object of this invention to provide a packet switching network, a network management equipment, and a packet switching device which increase the efficiency of connectionless data flow in a large data network.

It is a third object of this invention to provide a packet switching network, network management equipment, and a packet switching device which are not vulnerable to a physical layer error (transmission path disconnection, and so on) or a logical path error (VC (Virtual Circuit) or VP (Virtual Path) disconnection).

It is a fourth object of this invention to provide a packet switching network, a network management equipment, and a packet switching device which avoid non-instantaneous (for example, several seconds), local (for example, in a specific node) congestion caused by a continuous large amount of data called a burst of data.

A network according to this invention is composed of a connection-oriented core network and a plurality of connectionless access networks with a plurality of connections (which are called permanent virtual routes (PVR) in the following description) created among a plurality of edge nodes. Upon receiving a connectionless data flow from one of the access networks, the network management equipment selects one route from the plurality of PVRs and transfers data over that PVR. As the route selection criterion, the network management equipment uses the status of each PVR, for example, an available bandwidth of each PVR.

To check and control the available bandwidth, the network management equipment keeps track of the traffic of each node or each edge node uses RM (Resource Management) packets to control the flow.

A plurality of connections are set up in advance and, when a congestion or an error is detected, the connection is switched from the main systems to the subsystem.

The access network interface in each edge node keeps (performs shaping on) the data flow transmission rate within a predetermined bandwidth for each PVR and sends data over a logical route with a granted bandwidth.

In addition, a plurality of access links are set up between an access network and the core network using a multi-link procedure to divide the amount of traffic to be sent to the core network.

BRIEF DESCRIPTION OF THE DRAWINGS

FIG. 3 is a table listing an example of status data stored in a network management data storage device shown in FIG. 4.

FIG. 5 is a table showing an example of information on PVRs (Permanent Virtual Route) stored in edge node EA.

FIG. 6 is a table showing an example of information on PVRs (Permanent Virtual Route) stored in edge node EB.

FIG. 7 is a table showing an example of information on PVRs (Permanent Virtual Route) stored in edge node EC.

FIG. 8 is a table showing an example of information on PVRs (Permanent Virtual Route) stored in edge node ED.

FIG. 9 is a table showing an example of information on PVRs (Permanent Virtual Route) stored in relay node N1.

FIG. 10 is a table showing an example of information on PVRs (Permanent Virtual Route) stored in relay node N2.

FIG. 11 is a table showing an example of information on PVRs (Permanent Virtual Route) stored in relay node N3.

FIG. 15 is a flowchart showing an example of a routing table search and setup procedure used in edge node EA.

FIG. 19 is a diagram showing various data formats.

FIG. 20A is a diagram showing various data formats.

FIG. 20B is a diagram showing various data formats.

DETAILED DESCRIPTION OF PREFERRED EMBODIMENTS

The preferred embodiments of this invention are described with reference to the drawings.

Figure 1:
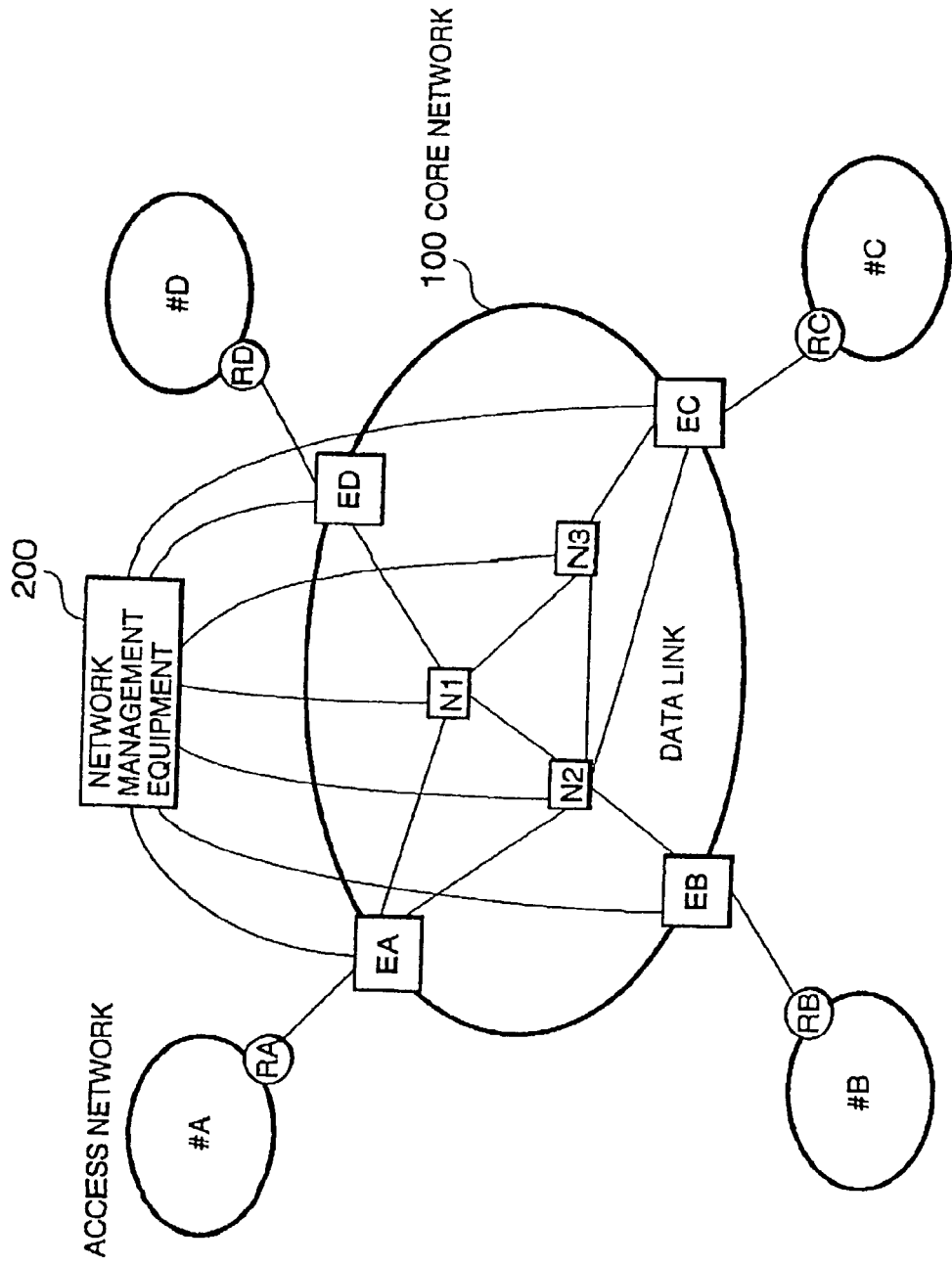
FIG. 1 is a connection diagram showing an example of the configuration of a packet switching network according to this invention.

FIG. 1 is a diagram showing an embodiment of a packet switching network according to this invention. Sub-networks #A, #B, #C, and #D are connected to edge nodes EA, EB, EC, and ED via border routers RA, RB, RC, and RD. The network area surrounded by the edge nodes EA, EB, EC, and ED is called a core network. The sub-networks connected to the core network 100 are collectively called access networks. FIG. 1 shows the core network and the access networks with bold-line ellipses The core network 100 is a connection-oriented network such as an ATM network. In FIG. 1, thin solid lines are drawn between edge nodes EA, EB, EC, and ED and relay nodes N1, N2, and N3. Edge nodes EA, EB, EC, and ED and relay nodes N1, N2, and N3 are connected to network management equipment 200 with control signal lines (shown in the figure with very thin lines).

A routing protocol within an access network, such as IP (Internet Protocol), is terminated at an edge node. Within the core network 100, a connection-oriented protocol such as ATM (Asynchronous Transfer Mode) or FR (Frame Relay) is used.

Assume that the IP addresses "101.102.103.104", "104.101.102.103", "103.104.101.102", and "102.103.104.101" are assigned to edge nodes EA, EB, EC, and ED, respectively.

Figure 2:
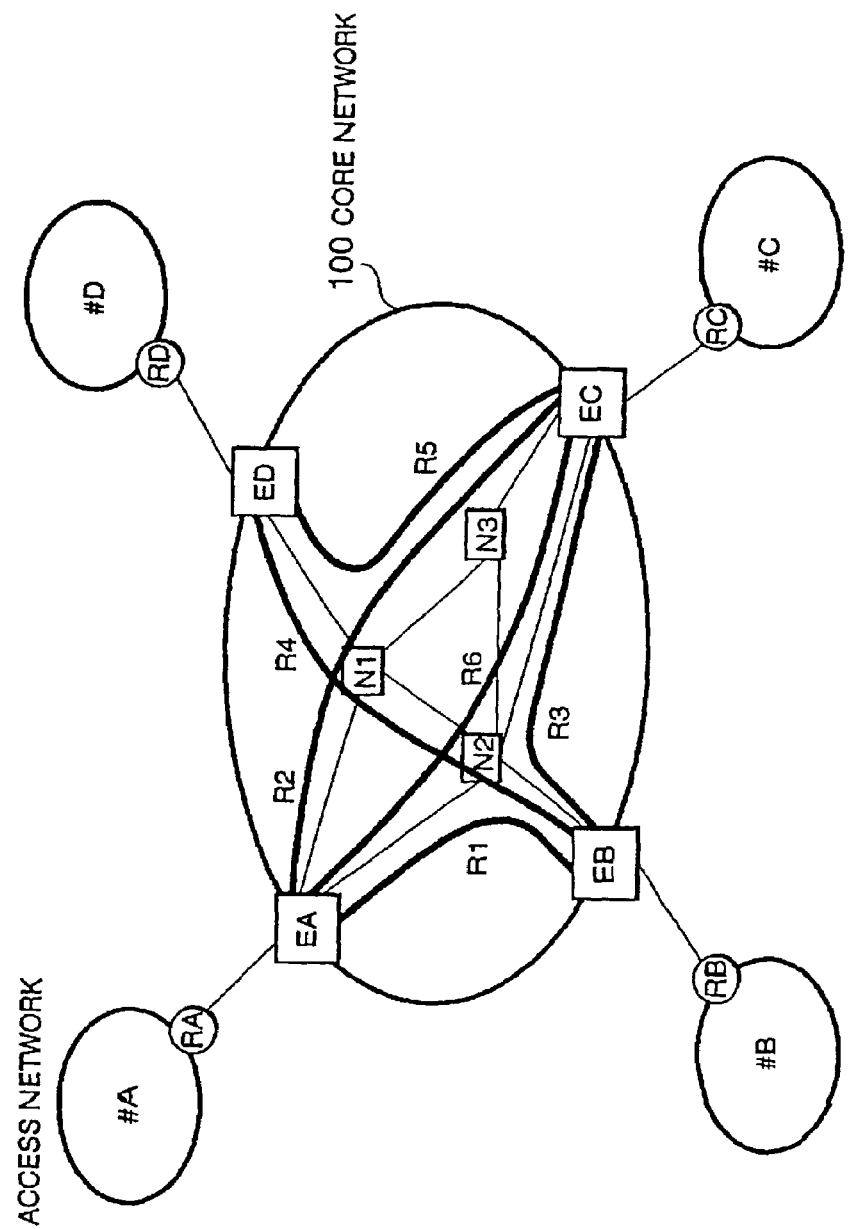
FIG. 2 is a model diagram showing an example of PVRs (Permanent Virtual Route) set up in the packet switching network according to this invention.

FIG. 2 is a diagram showing an example of PVRs (Permanent Virtual Route) set up in the packet switching network according to this invention. In this figure, the network management equipment 200 shown in FIG. 1 is omitted. In the core network configuration shown in FIG. 1, PVRs R1 to R6, created by the network management equipment 200 by connecting the edge nodes, are previously defined. PVRs R1 to R6 and the data links shown in FIG. 1 are related as shown in FIG. 3.

FIG. 3 shows the connection between points, route, and assigned bandwidth for each PVR in the core network shown in FIG. 2. The status data shown in FIG. 3 is stored in a network management data storage device 401 shown in FIG. 4.

In the communication between two edge nodes, data which is in the form of ATM cells is switched and transferred along a PVR. Between node edge EA and node edge EC, a plurality of PVRs (2), R2 and R6, which run along two different data links, are previously defined.

Figure 4:
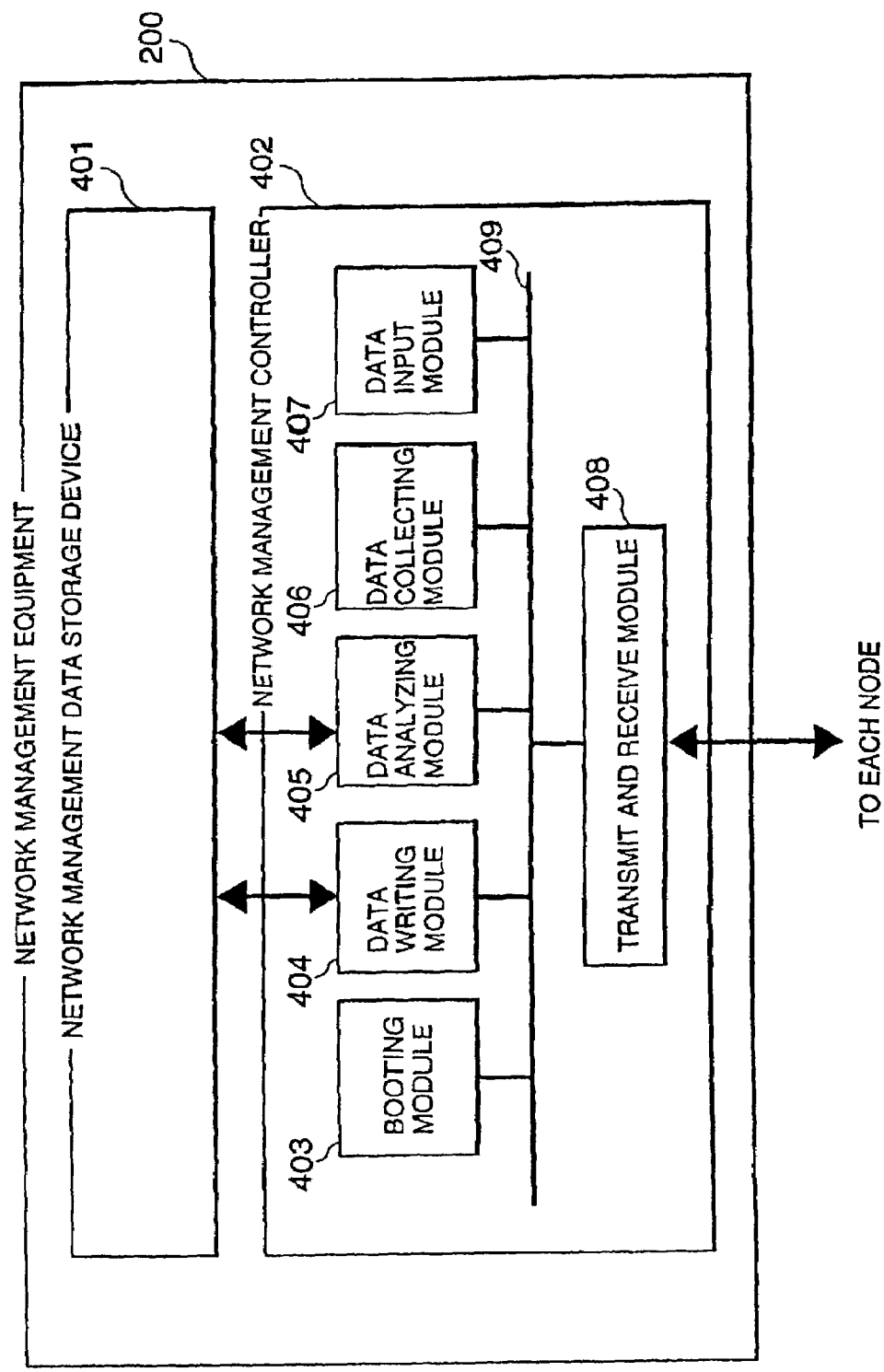
FIG. 4 is a block diagram showing an example of the configuration of a network management equipment shown in FIG. 1.

FIG. 4 is an example of the configuration of the network management equipment 200 shown in FIG. 1. The network management equipment 200 comprises a network management controller 402 which can be implemented by a CPU and a network management data storage device 401 which may be implemented by a memory device. The network management controller comprises a booting module 403, a data writing module 404, a data analyzing module 405, a data collecting module 406, a data input module 407, and a transmit and receive module 408. All modules are interconnected by an internal bus 409.

The transmit and receive module 408, connected to the nodes, transfer status data among edge nodes and relay nodes. The data writing module 404 and the data analyzing module 405 are connected to the network management data storage device 401. The former records status data and the latter analyzes status data.

Figure 21:
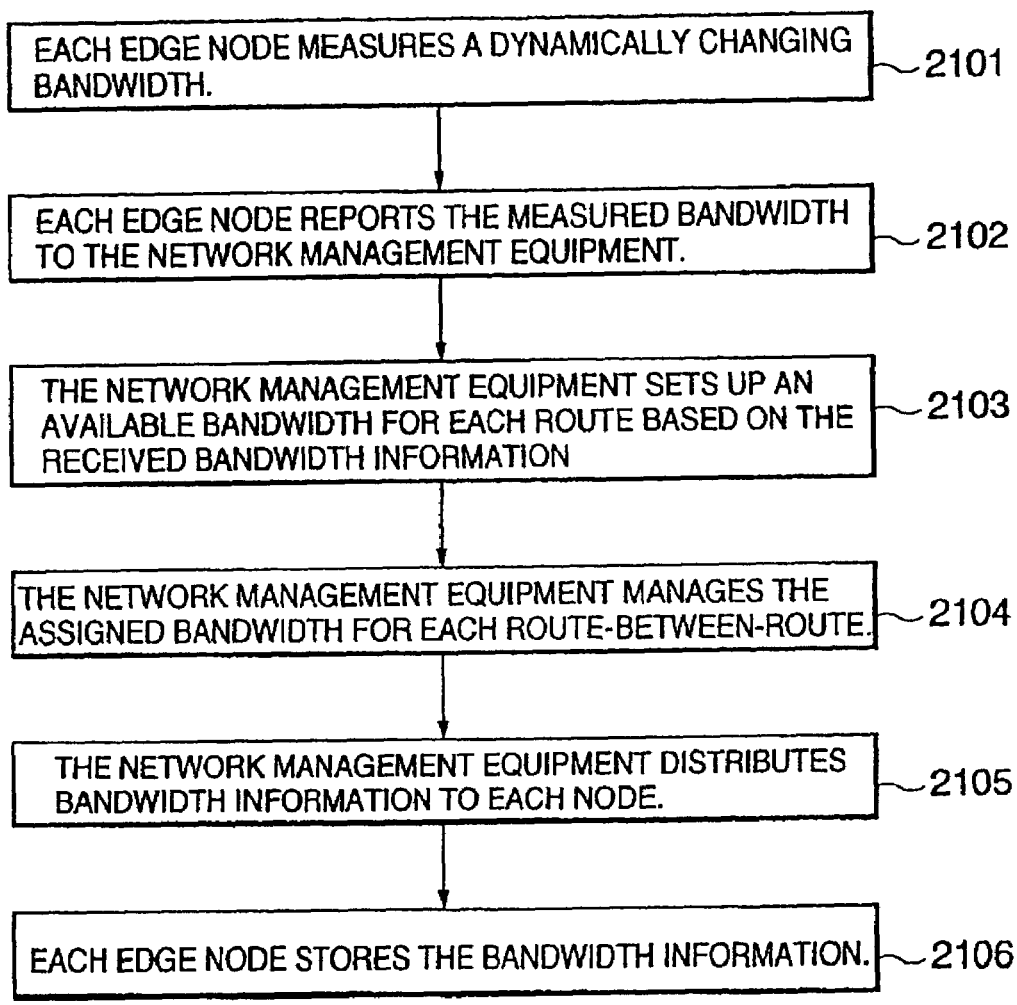
FIG. 21 is a flowchart showing how bandwidth information is registered in each node.
Figure 22:
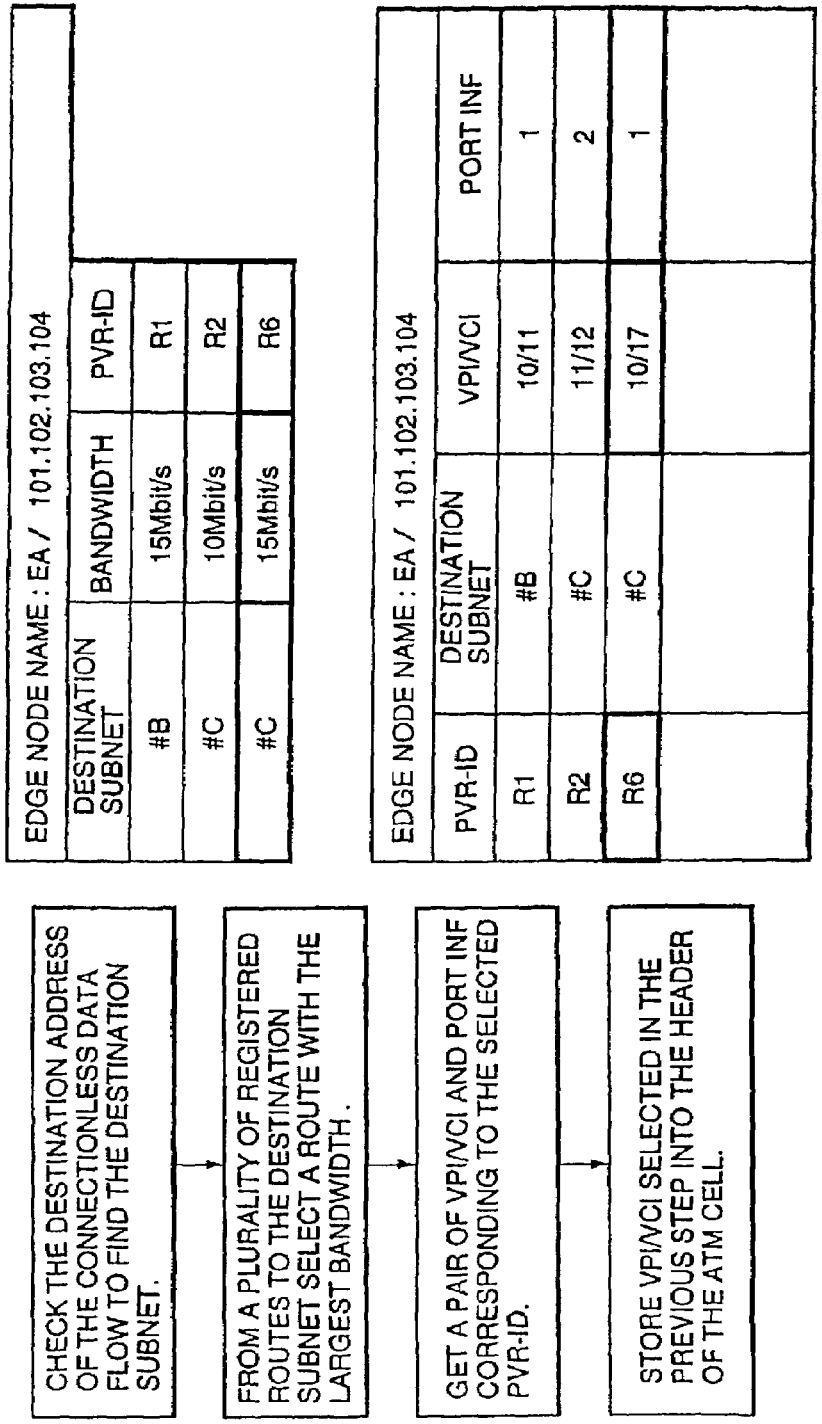
FIG. 22 is a flowchart showing an example of routing table setup in edge node EA.

FIG. 21 shows a procedure for storing bandwidth information in each node. This procedure is divided into the following steps: Each edge node or relay node measures a dynamically changing bandwidth (step 2101), the edge node or the relay node reports the measured bandwidth to the network management equipment (step 2102), the network management equipment sets up an available bandwidth for each route based on the received bandwidth information (step 2103), the network management equipment manages the assigned bandwidth for each route-between-route (step 2104), the network management equipment distributes bandwidth information to each node (step 2105), and each node stores the bandwidth information (step 2106).

The dynamically changing bandwidth refers to a bandwidth currently used by each node for data transfer. This bandwidth s measured at each node (edge node and relay node), for example, for each connection. An available bandwidth for each route refers to a bandwidth available for each transfer route for additional use. The network management equipment 200 calculates this available bandwidth for each node based on the dynamically changing bandwidth that was measured. An assigned bandwidth for each route-between-route is a bandwidth assigned to each route-between-route between access networks (that is, between edge nodes). The network management equipment determines this assigned bandwidth so that it does not exceed the available bandwidth for each route.

Each edge node and relay node shown in FIG. 2 have their own status data. FIG. 5 to FIG. 11 are examples of PVRs (Permanent Virtual Route) stored in edge nodes EA, EB, EC, and ED and relay nodes N1, N2, and N3. Based on the management data owned by the network management equipment 200 shown in FIG. 3, the destination subnet, VPI/VCI, and port INF (interface) are set up for each edge node.

FIG. 5 shows an example of PVRs stored in edge node EA. In FIG. 5, PVR-ID is a permanent route identifier which corresponds to that shown in FIG. 2. A destination subnet is a subnet to which data may be sent from subnet A. A VPI, virtual path identifier, identifies a virtual path connecting edge node EA to other nodes (in this case, relay nodes N1 and N2, and edge nodes ED and EB). Like a virtual path identifier, a VCI, like the virtual channel identifier, identifies the virtual channel of each node which is connected to edge node EA. Port INF is the number of a port interface of edge node EA. In this case, port 1 is the number of the interface port used for connection between edge node EA and relay node N2, and port 2 is the number of the interface port used for connection between edge node EA and relay node N1. Like FIG. 5, FIG. 6 shows an example of PVRs for edge node EB, FIG. 7 shows an example of PVRs for edge node EC, and FIG. 8 shows an example of PVRs for edge node ED.

FIG. 9 to FIG. 11 show examples of PVRs of relay nodes stored as in FIG. 5 to FIG. 8. FIG. 9 shows PVR information on relay node N1, FIG. 10 shows PVR information on relay node N2, and FIG. 11 shows PVR information on relay node N3. In FIG. 9 to FIG. 11, it is assumed that data flows from EA to EB for R1, EA to EC for R2, EB to EC for R3, EB to ED for R4, EC to ED for R5, and EA to EC for R6.

Figure 12:
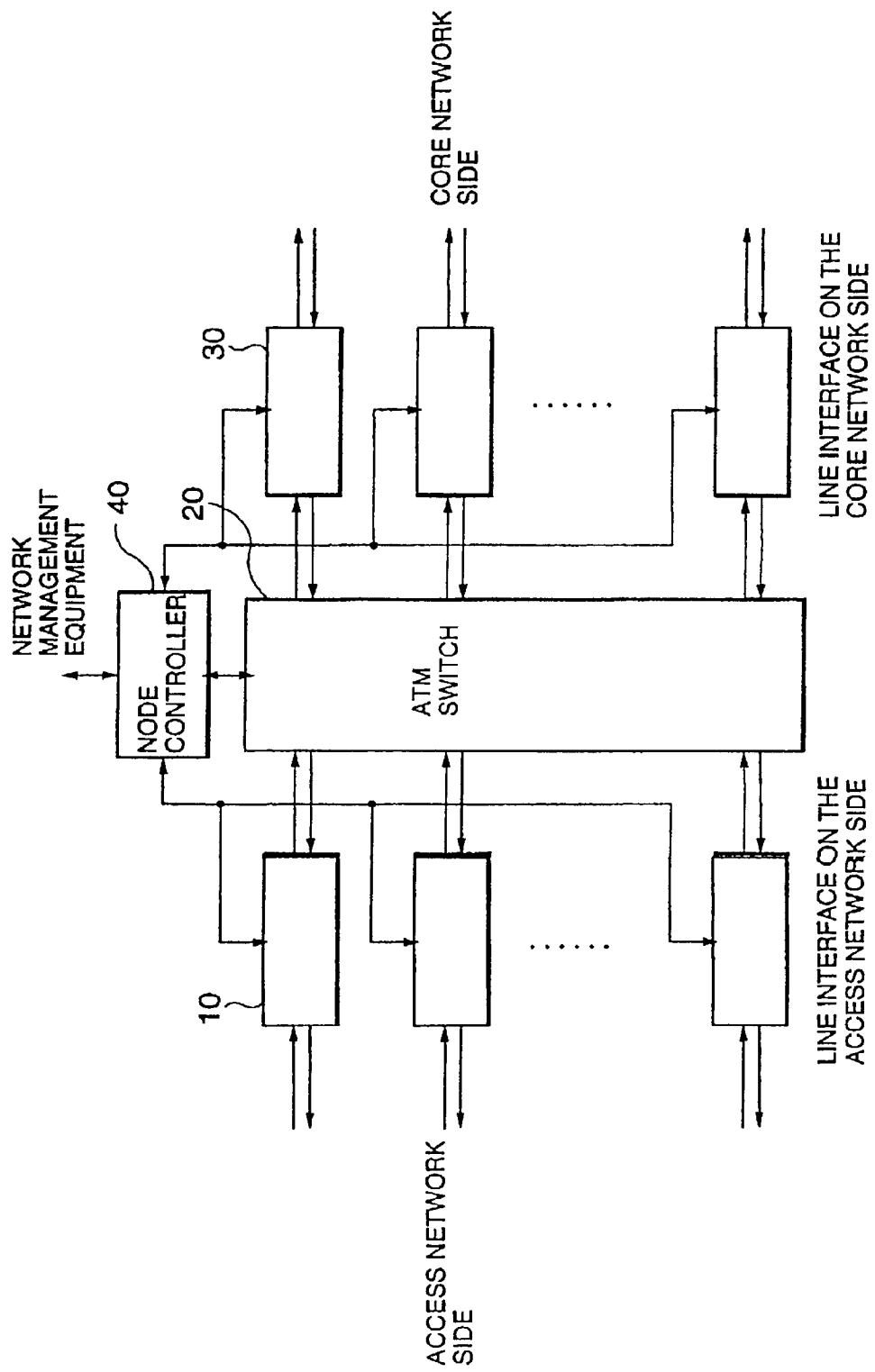
FIG. 12 is a block diagram showing an example of the configuration of an edge node (EA, EB, EC, ED) shown in FIG. 1.

FIG. 12 is a diagram showing an example of the configuration of an edge node (EA, EB, EC, ED). Each edge node comprises a line interface on the access network side 10, an ATM switch 20, a line interface on the core network side 30, and a node controller 40. The node controller 40 is connected to the line interface on the access network side 10, ATM switch 20, and line interface on the core network side 30.

The ATM switch uses the common buffer switch technology "Switching System" disclosed, for example, in Japanese Patent Laid-Open Publication (KOKAI) No. Hei 4-276943, U.S. patent application Ser. No. 08/306978, and EP Patent No. 502436.

Figure 13:
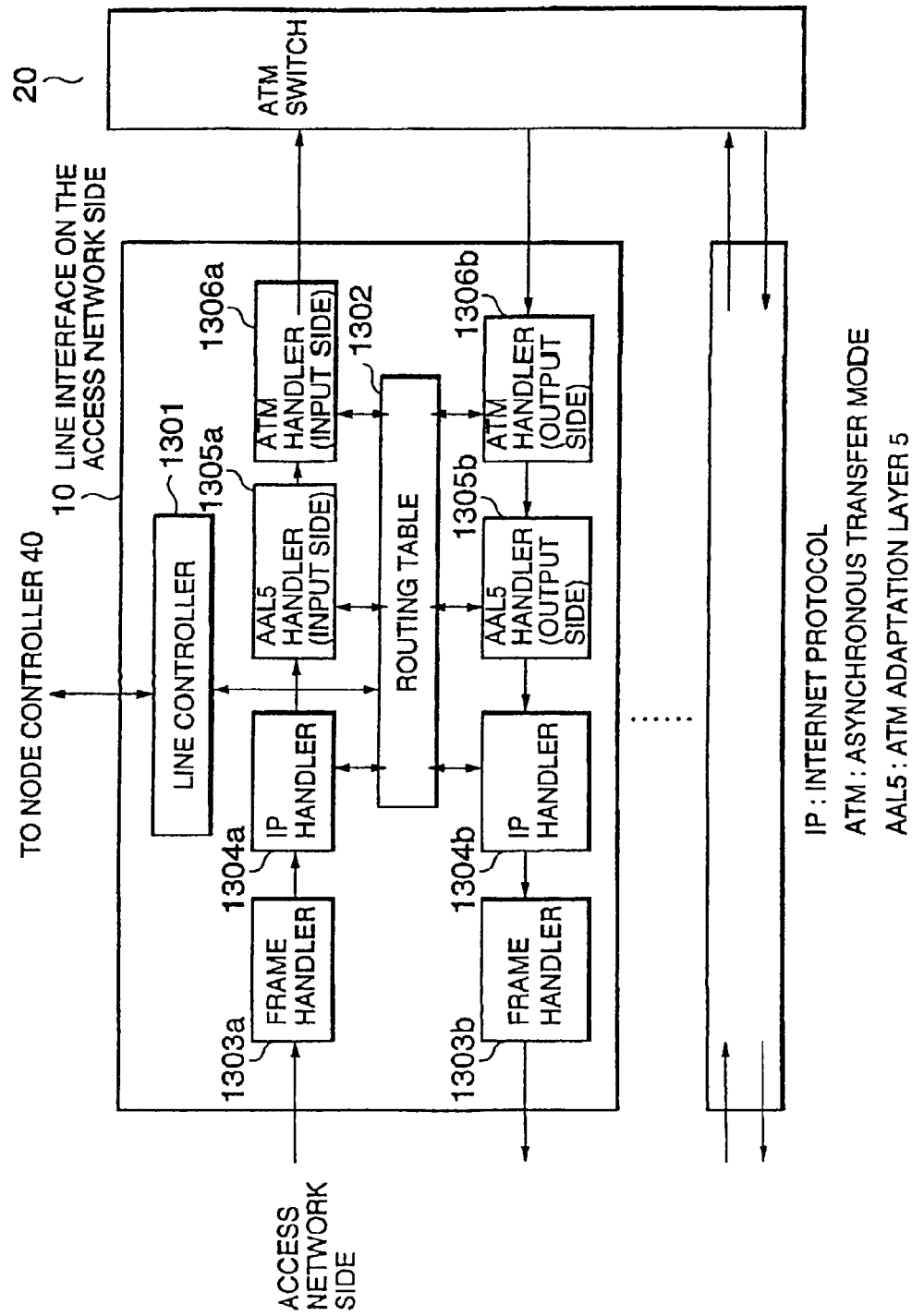
FIG. 13 is a block diagram showing an example of the configuration of a line interface on the access network side shown in FIG. 12.

FIG. 13 shows an example of the configuration of the line interface on the access network side 10. The line interface on the access network side 10 comprises a line controller 1301, a routing table 1302, a frame handler 1303, an IP (Internet Protocol) handler 1304, an AAL5 (ATM Adaptation Layer 5) handler 1305, and an ATM handler 1306. To pass data from the IP handler to the AAL5 handler, the multi-protocol encapsulation technology described in RFC1483 (Request For Comments 1483) issued by IETF (Internet Engineering Task Force), the Internet protocol standardization organization, is used.

The ATM handler shown in FIG. 13 contains a cell flow amount monitor circuit described in the "subscriber's line capacity display method for use in asynchronous transfer mode" disclosed in Japanese Patent Laid-Open Publication No. Hei 4-260245. Each edge node uses this monitor circuit to measure and monitor the transmission capacity for each connection.

Figure 18:
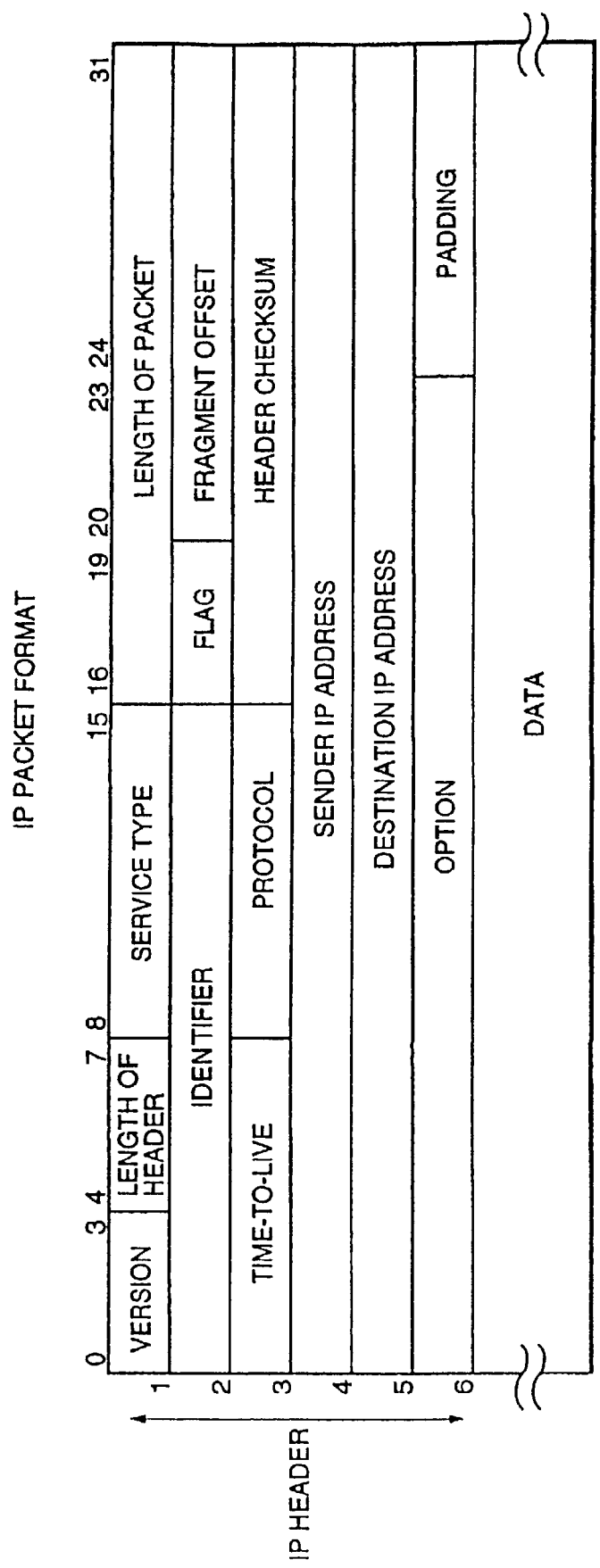
FIG. 18 is a diagram showing various data formats.

The line interface on the access network side 10 in FIG. 13 converts an IP connectionless data flow into ATM cells. FIG. 18 shows the format of an IP packet entered from the access network, and FIG. 19 shows the format of an ATM cell output to the core network.

Figure 14:
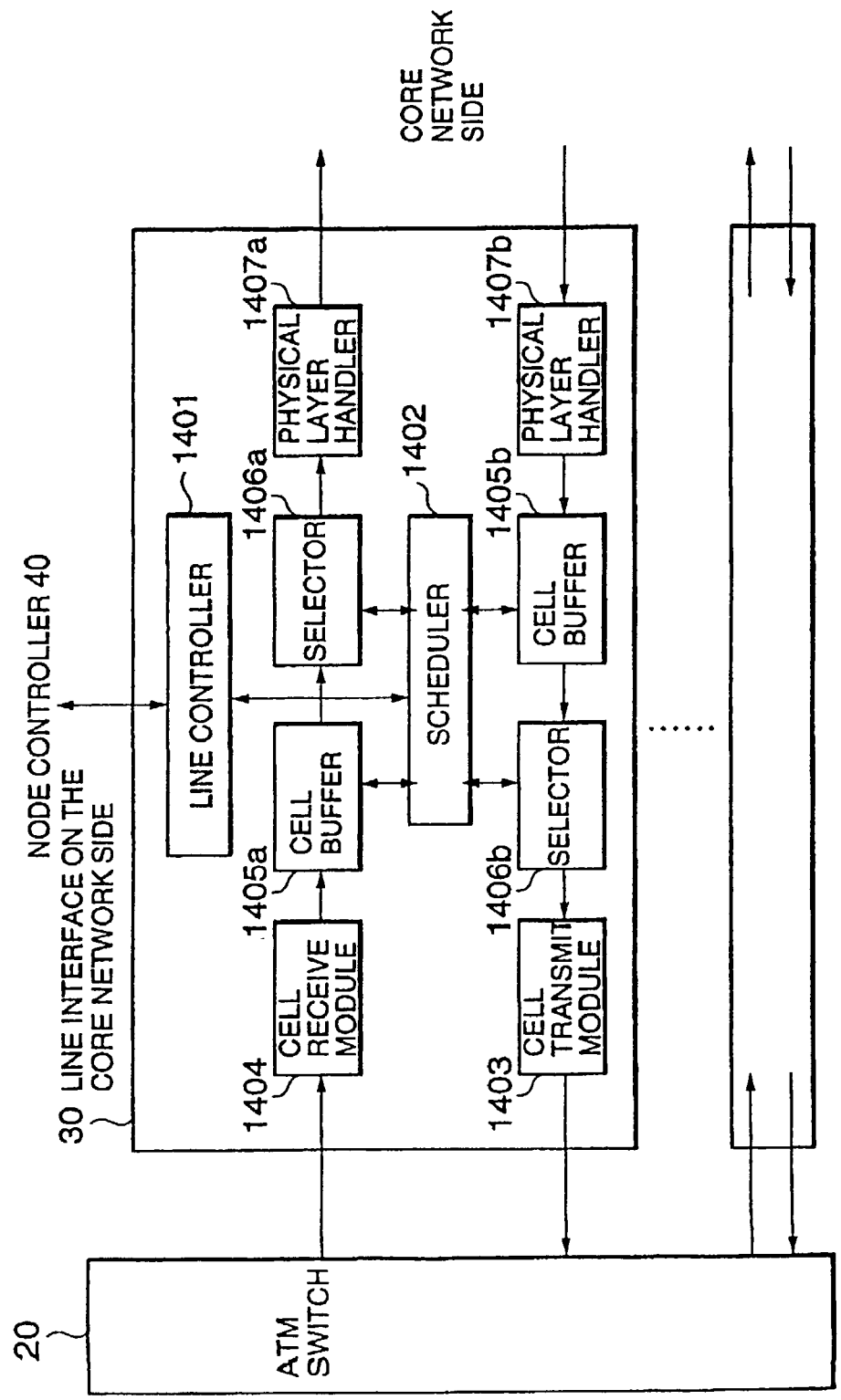
FIG. 14 is a block diagram showing an example of the configuration of a line interface on the core network side shown in FIG. 12.

FIG. 14 shows an example of the configuration of the line interface on the core network side 30. This interface comprises a line controller 1401, a scheduler 1402, a cell transmit module 1403, a cell receive module 1404, a cell buffer 1405, a selector 1406, and a physical layer handler 1407. The cell buffer, selector, and scheduler use a multi QOS shaper described in "Flow Control Method in a Network Node and Packet Switching System" disclosed in Japanese Patent Laid-Open Publication (KOKAI) No. Hei 9-181740, for example.

The following describes the steps in the bandwidth information processing flowchart (FIG. 21) and the modules involved in the processing (FIGS. 4, 12, and 13). The "each edge node measures the dynamically changing bandwidth" step (step 2101) in FIG. 21 is performed by the ATM handler 1306 shown in FIG. 13. The measured bandwidth is sent to the network management equipment 200 shown in FIG. 4 via the routing table 1302 and the line controller 1301 shown in FIG. 13 and via the node controller 40 shown in FIG. 12 (step 2102). Bandwidth information sent from the edge nodes is sent to, and stored in, the data collecting module 406 via the transmit and receive module 408 of the network management equipment 200. The available bandwidth of each route is calculated by the data analyzing module 405 of the network management equipment 200. The calculated available bandwidth is then stored in the network management data storage device 401 via the data writing module 404 (step 2103). The information stored in the data writing module 404 allows the assigned bandwidth for each route-between-route to be managed (step 2104). This bandwidth information is distributed from the network management equipment 200 to each edge node. More specifically, the information is distributed to the routing table 1302 via the network management data storage device 401, data writing module 404, and transmit and receive module 408 shown in FIG. 4, the node controller 40 shown in FIG. 12, and the line controller shown in FIG. 13 (step 2105). The bandwidth information is then stored in the routing table 1302 of each edge node.

A relay node is also capable of measuring the bandwidth and transmitting the bandwidth information. In addition, as in the above-described edge node, a relay node may store the bandwidth information sent from the network management equipment and may adjust the transmission capacity. These functions, if provided in the relay node, give an appropriate data transfer bandwidth to a route-between-route in the core network. Of course, even when this function is not provided in the relay node, the transmission capacity adjustment function provided on an edge node on the input side adjusts the bandwidth at an appropriate level.

The following explains the operation of the network and the edge node according to this invention. In the description, data originated in subnet #A is sent to subnet #C via border router RA, edge node EA, and edge node EC.

FIG. 15 shows an example of the routing table retrieval and setup procedure used in edge node EA. From edge node EA to destination subnet #C, two PVRs, R2 and R6, are set up in advance. The two bandwidths, 20 Mbit/s for R2 and 10 Mbits/s for R6, are stored in advance according to the bandwidth storage step (step 2106) shown in FIG. 21.

A connectionless data flow, originated within subset #A for transmission to subnet #C, reaches edge node EA via border router RA. Edge node EA checks the destination address to find that the destination subnet of this data flow is subnet #C. Then, from the two PVRs, R2 and R6, between edge node EA and subnet #C, edge node EA selects R2 which has the largest bandwidth. The heap sort method, described, for example, in page 239 of "Data structure and algorithm" (Baifukan Co., Ltd.; March 1987), is used as the fast retrieval method for the largest bandwidth route.

In this example, sending edge node EA selects a PVR. The network management equipment may ask edge node EA to select one of the PVRs.

Next, a pair of VPI/VCI=11/12 and port INF=2 corresponding to the PVR-ID of R2 is selected. The ATM cells generated by converting the connectionless data flow are then sent with VPI/VCI=11/12 in the header.

Figure 23:
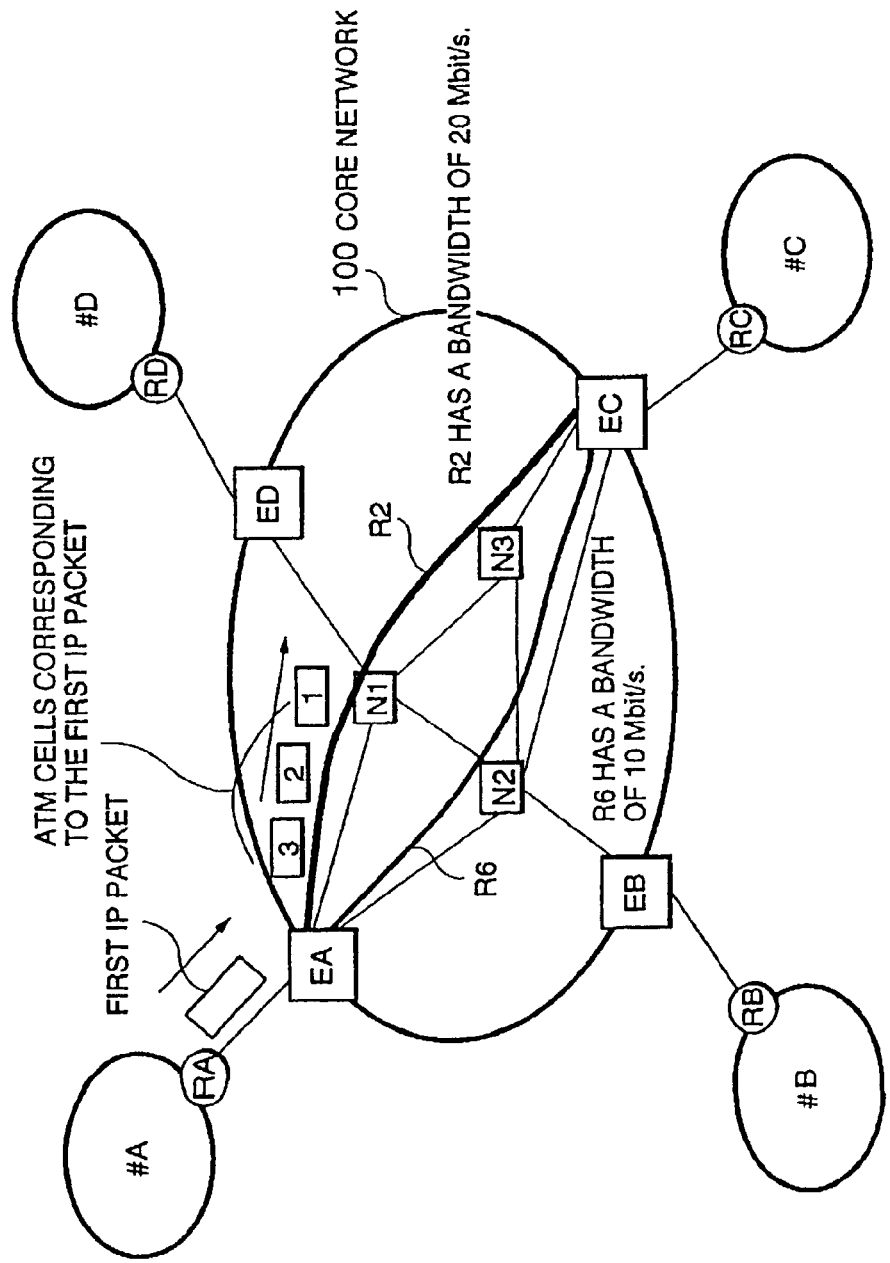
FIG. 23 is a diagram showing how data is transferred over a selected PVR.

FIG. 23 shows how data is transferred when R2 is selected as the PVR. Comparison between two PVRs, R2 and R6, indicates that the bandwidth of R2 is larger than that of R6, meaning that the first IP packet received at edge node EA for transmission to subnet #C is converted to the ATM cells and then assigned to PVR R2 for transmission. The numbers 1, 2, and 3 in the ATM cells converted from the first IP packet show the sequence in which the ATM cells will be sent.

Also, the cells sent over PVR R2 are assembled into a packet at edge node EC for transfer to subnet #C.

As mentioned above, the network in this embodiment has the PVRs (Permanent Virtual Route) registered in advance in the core network 100, converts the destination IP address to an ATM address when data is transferred, and selects a PVR (permanent virtual route) corresponding to the ATM address for transfer of the IP packet, thus eliminating the connection setup delay time and decreasing the delay and the delay variation involved in the data transfer. At the same time, the number of times the control packets are sent for setting up connections and reserving the resources is reduced.

In addition, within the core network 100, pop-by-pop routing by the processor (that is, the processor interprets the destination IP address and selects the output port destination of an IP packet in the same way the router distributes the IP packet) is not performed. Instead, data is stored in ATM cells for switching by the hardware. This reduces the data transfer delay in the core network.

Selecting the largest-bandwidth route from a plurality of PVRs (permanent virtual routes) previously registered with the core network 100 increases the connectionless data flow efficiency in a large data network.

Next, the operation that is performed when there is a change in the core network status is described.

Assume that, while IP data is transferred with PVR R2 selected as shown in FIG. 23, the status changes and the procedure shown in FIG. 21 is executed for the network management equipment 200 and the nodes, and, as a result, the bandwidth information, are re-registered. FIG. 23 shows the new bandwidth setup status. As shown in the table, PVR R2 has the bandwidth of 10 Mbits/s and PVR R6 has the bandwidth of 15 Mbits/s.

This means that, while IP data is transferred, the network management equipment 200 and the nodes work together to change the status (bandwidth in this example) of the core network.

A connectionless data flow, originated within subset #A for transmission to subset #C, reaches edge node EA via border router RA. Edge node EA checks the destination address to find that the destination subnet of this data flow is subnet #C. Then, from the two PVRs, R2 and R6, between edge node EA and subnet #C, edge node EA selects R6 which has the largest bandwidth.

A pair of VPI/VCI=10/17 and port INF=1 corresponding to the PVR-ID of the selected R6 is obtained. The ATM cells generated by converting the connectionless data flow are then sent with VPI/VCI=10/17 in the header.

Figure 24:
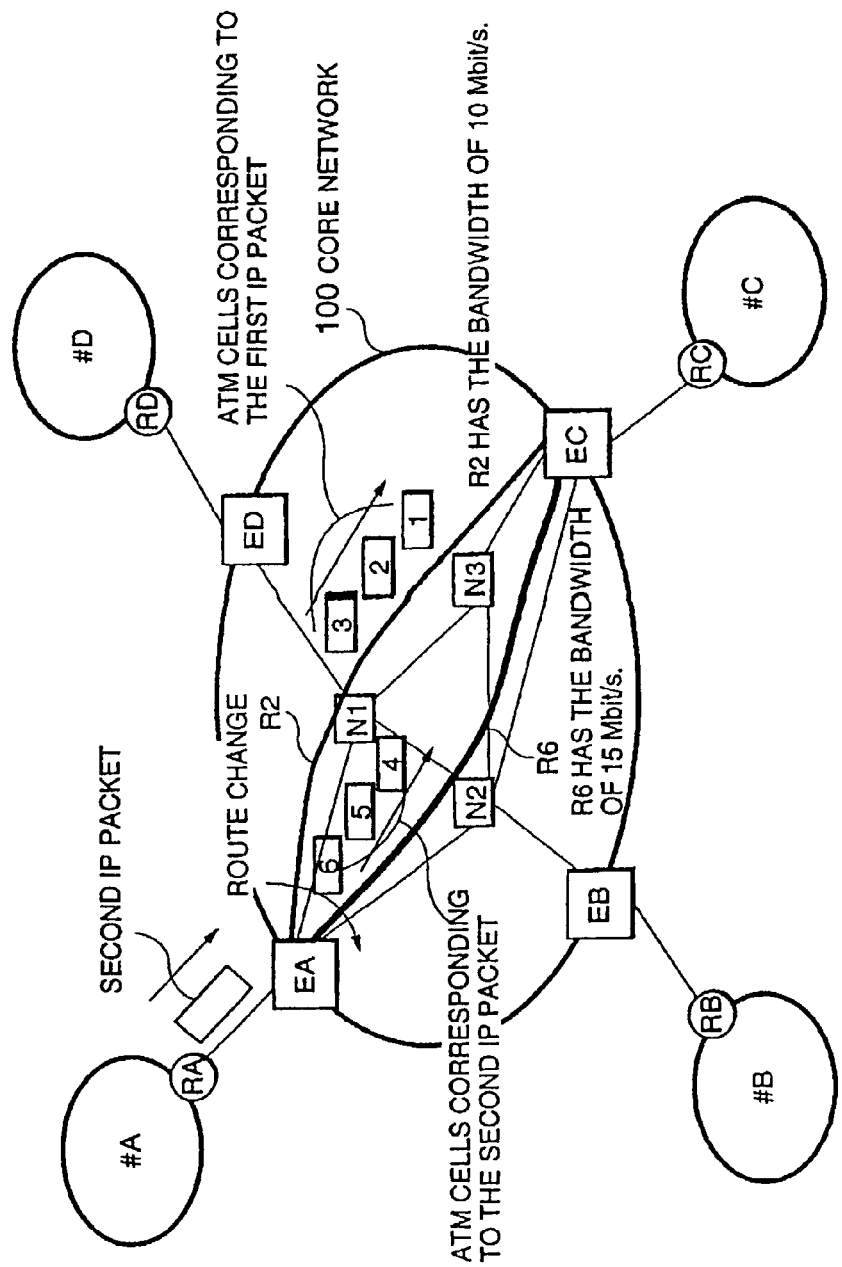
FIG. 24 is a diagram showing how data is transferred over selected PVRs.

FIG. 24 shows how data is transferred after the new PVR is selected. Comparison between two PVRs, R2 and R6, indicates that the bandwidth of R6 is larger than that of R2, meaning that the IP data flow received at edge node EA for transmission to subnet #C is converted to the ATM cells and then assigned to PVR R6 for transmission. That is, the route along which the ATM cells are sent has been changed from that shown in FIG. 23. The numbers 1, 2, 3, 4, 5, and 6 in the ATM cells show the sequence in which the ATM cells will be sent. ATM cells 1, 2, and 3 are those sent via PVR R2 in the status shown in FIG. 23, while ATM cells 4, 5, and 6 are those sent via the new PVR R6. ATM cells 1, 2, and 3 correspond to the first IP packet shown in FIG. 23, while ATM cells 4, 5, and 6 correspond to the second IP packet shown in FIG. 24.

When the old route is changed to the new route as the status changes from that shown in FIG. 23 to that shown in FIG. 24, the IP switch disclosed, for example, in Japanese Patent Application No. Hei 8-344981, U.S. patent application Ser. No. 08/998,382, and EP Patent No. 971228333 is used. This switch changes the route after the last cell of the preceding IP packet has been sent, preventing the packet from being discarded.

The ATM cells sent over two different PVRs are assembled into an IP packet at the line interface on the access network side 10 at edge node EC for transfer to subnet #C.

As described above, the network in this embodiment checks the bandwidths of the PVRs in the core network 100 at regular intervals and distributes IP packets to an appropriate PVR according to the bandwidth status at that time, further increasing the efficiency of connectionless data flow transfer in a large data network.

In addition, control packets for connection setup and resource reservation are sent in this embodiment only when the PVRs are set up and when the PVR bandwidth information is updated. A connection need not be set up each time a request for data transfer between two access networks is generated. The number of control packet transferd in the core network is therefore reduced in this embodiment.

Figure 26:
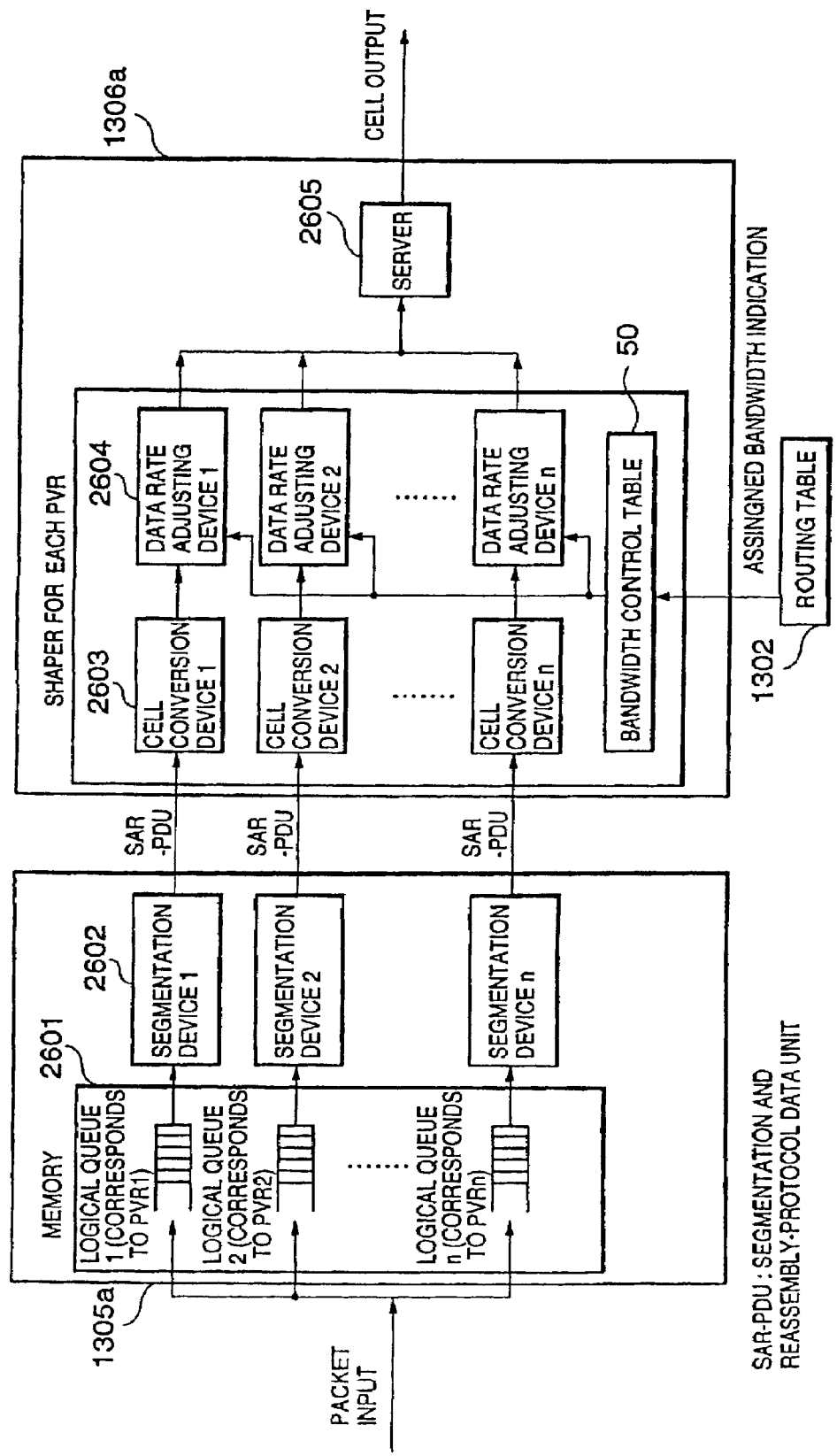
FIG. 26 is a block diagram showing an example of the configuration of an AAL 5 handler and an ATM handler on the input side shown in FIG. 13.

FIG. 26 shows an example of the configurations of the AAL5 handler (input side) 1305 and the ATM handler (input side) 1306 contained in the line interface on the access network side 10 shown in FIG. 13. An input packet is buffered in one of the logical queues 2601 each corresponding to a PVR. An output packet from the logical queue is sent to a segmentation device 2602 and is output as an SAR-PDU (Segmentation and Reassembly-Protocol Data Unit). The SAR-PDU which is output, for each PVR, from the AAL5 handler (input side) 1305a is sent to a cell conversion device 2603 of the ATM handler 1306a and then to a data rate adjusting device 2604. The data rate adjusting device 2604 performs cell shaping for each PVR according to the bandwidth information previously set up in the routing table 1302. (Shaping refers to the adjustment of the data reading rate of cells, stored in the buffer memory, so that the rate does no exceed the instantaneous data rate.) Shaped cells are sequenced into the correct output sequence in a server 2605 and then output to the ATM switch.

As described above, the network in this embodiment performs shaping for each PVR according to the assigned bandwidth in order to allocate a connectionless data flow, sent from each subnet, to a bandwidth granted PVR. Thus, non-instantaneous, local network congestion generated by a burst of data can be avoided.

Although an available bandwidth is used in this embodiment to select a PVR at an edge node- Other information may also be used as the route selection criterion. For example, the buffer status information on each edge node may be used. A route may also be selected according to the time or randomly.

Figure 17:
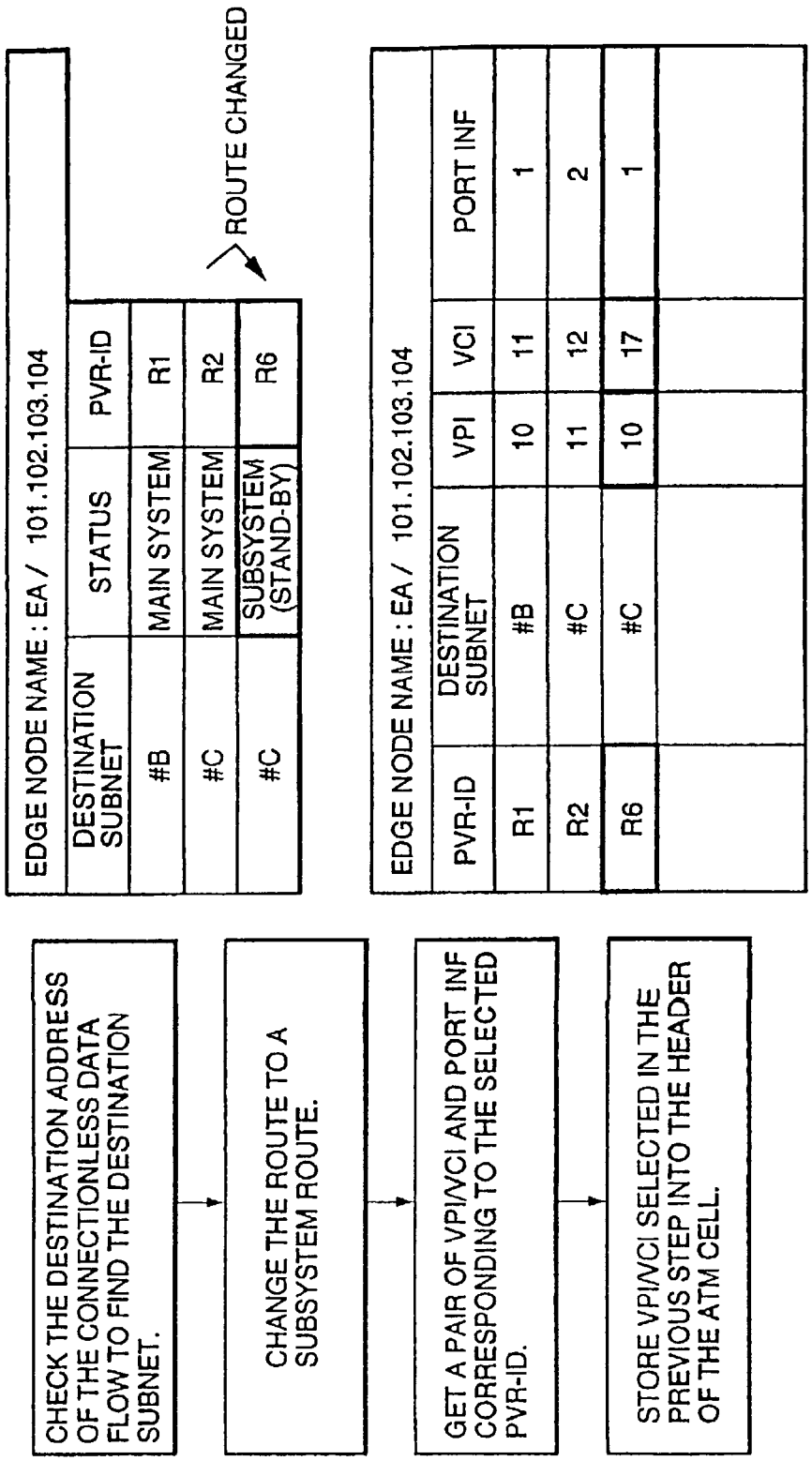
FIG. 17 is a flowchart showing an example of routing table setup in edge node EA.

Next, the following explains the operation that is performed when congestion or an error occurs in the core network:

FIG. 17 shows an example of routing table setup in edge node EA. Assume that R2 is first set up as the PVR from edge EA to subnet #C.

Figure 16:
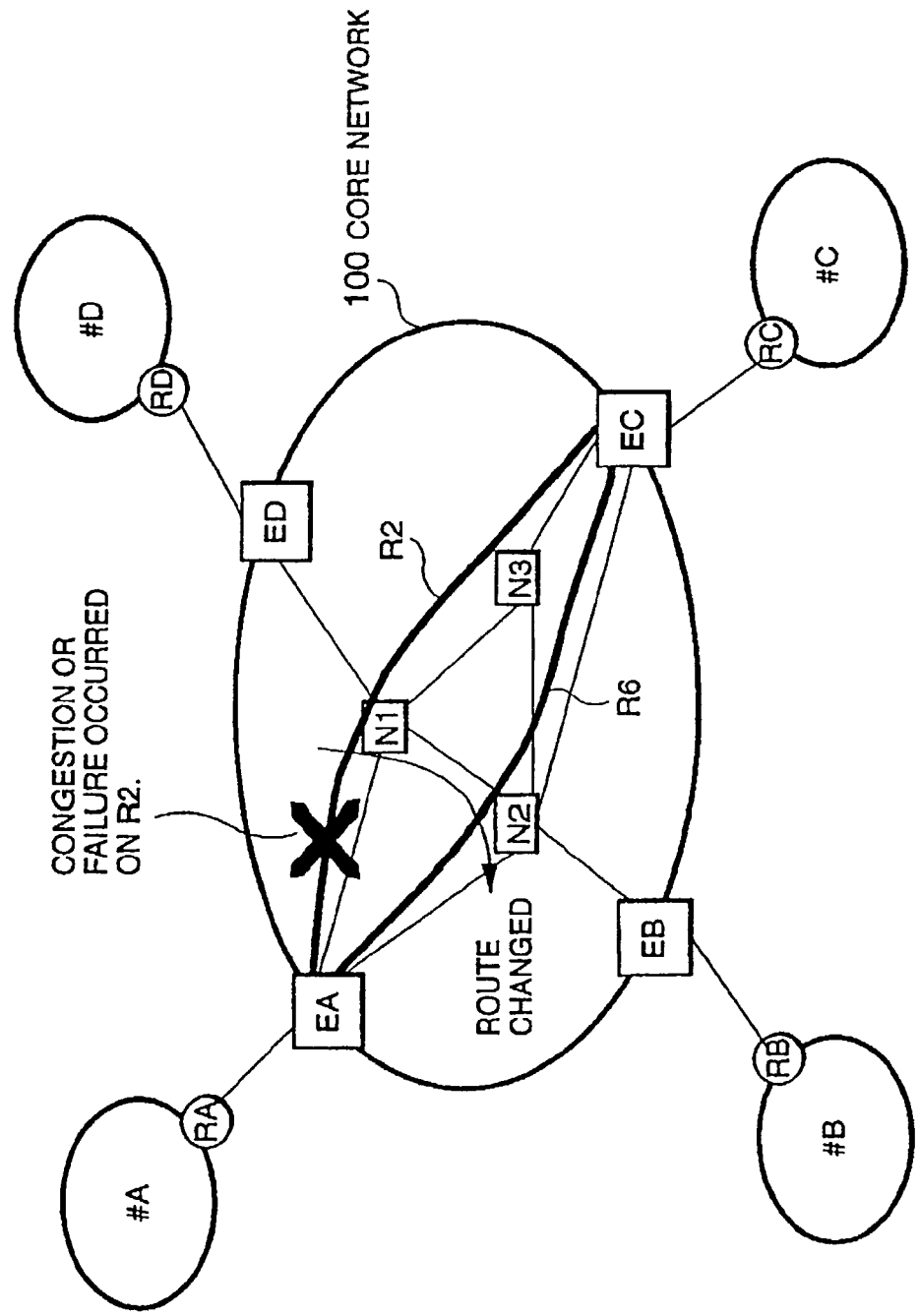
FIG. 16 is a diagram showing that a congestion or an error was detected on R2 shown in FIG. 2.

When congestion or an error is detected on R2 as shown in FIG. 16, the PVR is switched from R2 (main system) to R6 (subsystem) as shown in FIG. 17.

The OAM (Operating and Management) function in the ATM detects a transmission path error. The network management equipment 200 detects congestion, for example, when it receives congestion information from a node which detects congestion. Then, the network management equipment 200 tells the nodes to switch the PVR to the subsystem PVR.

For example, an edge node checks the amount of data in the logical queue provided for each PVR in the common buffer at regular intervals, and when the amount exceeds a predetermined value, determines that a congestion has occurred on that PVR.

Thus, this embodiment provides a packet switching network which is not vulnerable to a physical layer error (transmission path disconnection, and so on) or a logical path error (VC or VP disconnection).

In the example described above, the network management equipment 200 stores PVR bandwidth information in the routing table 1302 based on the bandwidth information measured at each node, as shown in FIG. 21. Another way to set up PVR bandwidth information is through the ABR (Available Bit Rate)—based flow control which is performed among the edge nodes (traffic management specification version 4.0 prepared by ATM-Forum, one of the commercial standardization organizations). This flow control is performed by periodically embedding RM cells (resource management cells) into the data cell flow and by performing closed-loop feedback control based on the data cell rate. RM cells are used to periodically monitor an available bandwidth between any two edge nodes in the core network and to adjust the cell output rate according to the bandwidth. The following describes how bandwidth information is set up with the use of RM cells. When RM cells are used to set up bandwidth information, the network management equipment does not need to manage bandwidths.

Figure 27:
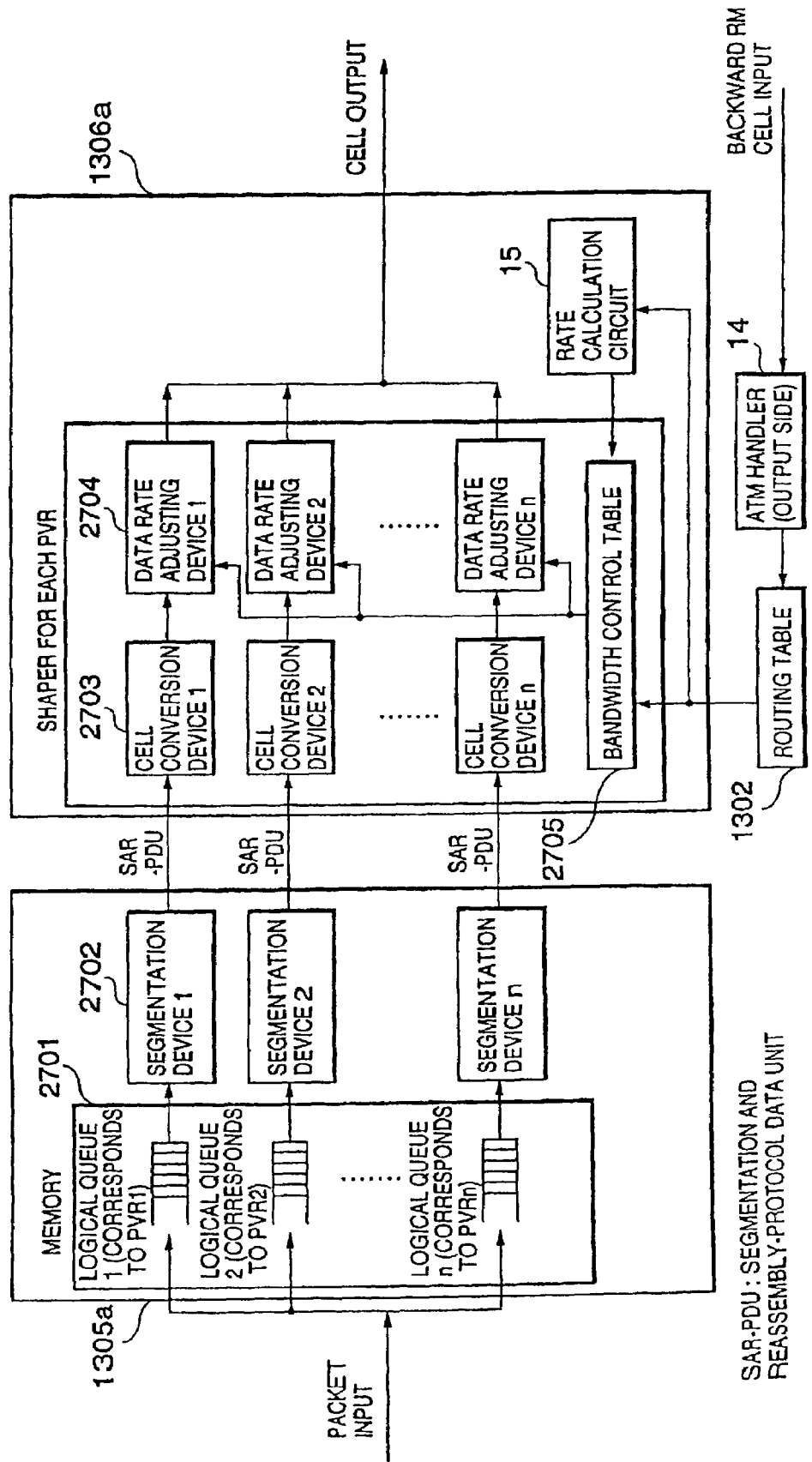
FIG. 27 is a block diagram showing an example of the configuration of the AAL 5 handler and the ATM handler on the input side shown in FIG. 13.

FIG. 27 shows an example of the configuration of the AAL5 handler (input side) 1305a and the ATM handler 1306a in the line interface on the access network side 10 shown in FIG. 13. An input packet is buffered in one of the logical queues 2701 each corresponding to a PVR. An output packet from the logical queue 2701 is sent to a segmentation device 2702 and, from this device, output as an SAR-PDU (Segmentation and Reassembly-Protocol Data Unit). The SAR-PDU which is output, for each PVR, from the AAL5 handler (input side) 1305a is sent to a cell conversion device 2703 of the ATM handler 1306a, and then to a data rate adjusting device 2704. The data rate adjusting device 2704 performs cell shaping for each PVR according to the bandwidth information previously set up in the routing table 1302.

Next, the dynamic shaping operation for each PVR is described.

(1) Explicit rate control

An ATM handler 14 (output side) stores the maximum allowable data rate (ACR: Allowed Cell Rate) in the routing table 1302 based on the explicit bandwidth information contained in a captured backward RM cell. A bandwidth control table 2705 is set up according to the ACR value, and the cell output rate is adjusted for each PVR based on this value. The shaper for each PVR uses the common buffer technology described, for example, in "Switching System" disclosed in Japanese Patent Laid-Open Publication No. Hei 4-276943. That is, in the common buffer, a logical queue is provided for each PVR, and cells are read from the common buffer under control of the bandwidth control table (This corresponds to the data rate adjusting device.) The bandwidth control table contains data specifying a logical queue in the common buffer from which a packet is to be read and a time at which that packet is to be read.

Explicit bandwidth information in a backward RM cell is used, as appropriate, to rewrite the bandwidth control table. This enables dynamic shaping operation to be performed for each PVR.

(2) Binary mode rate control

Based on the setting of the CI (Congestion Indication) bit or the NI (No Increase) bit in a backward RM cell captured by the ATM handler (output) 14, a rate calculation circuit 15 calculates the maximum allowable data rate (ACR: Allowed Cell Rate). Binary mode rate control differs from explicit mode rate control in that the ACR value relatively increases, decreases, or remains unchanged according to the setting of the CI bit and the NI bit. Once the ACR value is set up, the subsequent operation is similar to that of explicit rate control.

The data rate adjusting device comprises a device for generating RM cells and for inserting RM cells into data.

FIG. 20A and FIG. 20B show the format of an RM cell (resource management cell) used for bandwidth setup. The rate calculation circuit and the device for generating RM cells and for inserting RM cells into data, described in "Cell output control circuit and control method" disclosed in Japanese Patent Laid-Open Publication (KOKAI) No. Hei 9-247169 and U.S. patent application Ser. No. 08/810,733 are used.

Dynamically shaping the bandwidth for each PVR according to the status of the core network enables a connectionless data flow from each subnet to be assigned efficiently to a PVR. Thus, this method avoids non-instantaneous, local network congestion generated by a burst of data.

The following explains an example in which a data flow is transferred between two subnets via a plurality of PVRs using a multi-link protocol.

Figure 25:
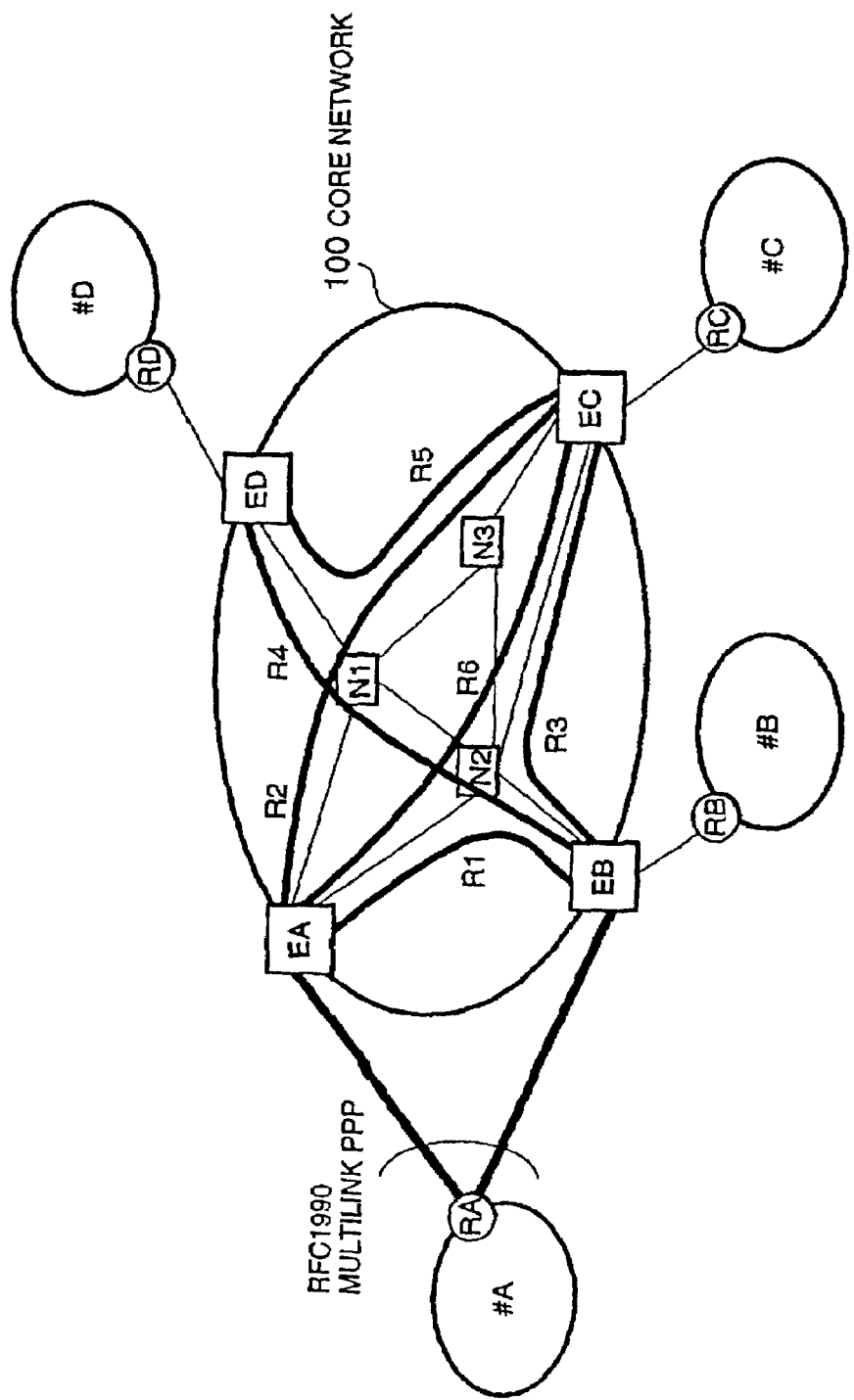
FIG. 25 is a connection diagram showing another configuration of a packet switching network according to this invention.

FIG. 25 shows an example of a network in which the data links (shown by bold lines in the figure) are set up from border router RA to edge node EA and from border router RA to edge node EB using the PPP (point to point) Multilink Protocol defined by RFC1990 (Request for comments 1990) prepared by IETF (Internet Engineering Task Force). The "multilink protocol" combines a plurality of data links into one logical data link as if there was one data link. (In FIG. 25, it is assumed that there is a physical connection between border router RA and edge node EA and between border router RA and edge node EB). In this example, a data flow, generated within subnet #A for transmission to subnet #C, may be divided into two at border router RA: a data flow to be sent to edge border EA and a data flow to be sent to edge border EB.

The two PVRs, for example R2 and R3, are assigned to the route from edge node EA to edge node EC and to the route from edge node EB to edge node EC, respectively.

A data flow transferred from border router RA to edge node EA is transferred via PVR R2 to edge node EC and, after being assembled into a packet, transferred to border router RC. A data flow transferred from border router RA to edge node EB is transferred via PVR R3 to edge node EC and, after being assembled into a packet, transferred to border router RC. A sequence of packets originated within subnet #A which are transferred via the two PVRs, R2 and R3, are arranged into the original sequence at border router RC.

As mentioned, data traffic is divided using a multi-link protocol to avoid non-instantaneous, local congestion in the core network which may occur because of a burst of data. Thus, the traffic load in the core network 100 is well-balanced.

This configuration also has a plurality of links from border router RA to the core network 100. Therefore, even if an error occurs in the data link from border router RA to edge node EA, data traffic may be sent from border RA to edge node EB. This ensures survivability.

In a preferred mode of this invention, setting up connections in advance eliminates the connection setup time, reduces the delay and delay variations involved in data transfer, and decreases the number of times the control packet for connection setup and resource reservation must be sent.

In a preferred mode of this invention, changing the route, over which data traffic from a connectionless access network is sent, according to the status of the connection-oriented core network enables connectionless data flow processing to be performed effectively in a large data network.

In a preferred mode of this invention, a packet switching network which is not vulnerable to a physical layer error (transmission path disconnection, and so on) or a logical path error (VC or VP disconnection) is provided.

In a preferred mode of this invention, a plurality of data links from an access network to the core network, which are set up using a multi-link procedure, allow the amount of input traffic to the core network to be divided, thus avoiding non-instantaneous, local network congestion which may be caused by a burst of data.

What is claimed is:

1. A network for transferring packets between a plurality of packet communication networks, comprising:
   a plurality of edge nodes connected to said packet communication networks;

a plurality of relay nodes connected between said edge nodes;

a network management equipment connected to each of said edge nodes and said relay nodes, wherein said network management equipment comprises:

a means for setting up a plurality of routes between said edge nodes in advance of a packet transfer request, setting up an available allotted bandwidth to each of the routes, and registering to each of the first nodes a destination node and a path of the destination node corresponding to the route before said packet transfer request;

a means for collecting bandwidth information on network status of said routes respectively from said edge nodes and said relay nodes located on said plurality of routes; and a means for sending information on available routes and said bandwidth information on the network status respectively to said edge nodes and said relay nodes in accordance with said bandwidth information on the network status of the routes being collected; and wherein each of said edge nodes and said relay nodes comprise:

a means for measuring said bandwidth information of a route and for sending said bandwidth information on said network status thus measured to said network management equipment, and wherein said edge nodes further comprise:

a means for storing said bandwidth information on the network status and said route sent from said network management equipment;

a means for selecting a route from said plurality of routes in accordance with a packet destination and said information on the route and said bandwidth information being stored in said means for storing;

a means for converting an IP packet into a plurality of cells; and a means for transferring said plurality of cells to said selected route.

2. A network according to claim 1, wherein said information on the network status is a network failure information.

3. A network according to claim 1, wherein said information on the network status is a congestion information.

4. A network according to claim 1, wherein said edge node sends out said plurality of cells to said selected route by adjusting output speed or output timing interval.

* * * * *